US011446564B2

(12) United States Patent
Kitahara et al.

(10) Patent No.: US 11,446,564 B2
(45) Date of Patent: *Sep. 20, 2022

(54) INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Shinji Kitahara, Kyoto (JP); Atsushi Yamazaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 21 days.

This patent is subject to a terminal disclaimer.

(21) Appl. No.: 17/210,041

(22) Filed: Mar. 23, 2021

(65) Prior Publication Data

US 2021/0205697 A1 Jul. 8, 2021

Related U.S. Application Data

(63) Continuation of application No. 16/702,177, filed on Dec. 3, 2019, now Pat. No. 10,987,572.

(30) Foreign Application Priority Data

Jul. 18, 2019 (JP) .............................. JP2019-132903

(51) Int. Cl.
*A63F 13/212* (2014.01)
*A63F 13/211* (2014.01)
*A63F 13/245* (2014.01)

(52) U.S. Cl.
CPC .......... *A63F 13/212* (2014.09); *A63F 13/211* (2014.09); *A63F 13/245* (2014.09); *A63F 2300/1006* (2013.01); *A63F 2300/1031* (2013.01); *A63F 2300/1043* (2013.01)

(58) Field of Classification Search
None
See application file for complete search history.

(56) References Cited

U.S. PATENT DOCUMENTS

| | | | |
|---|---|---|---|
| 10,429,924 B1 * | 10/2019 | Kerber | A63F 13/5255 |
| 2003/0031062 A1 * | 2/2003 | Tsurugai | A63F 13/211 |
| | | | 365/200 |
| 2008/0064498 A1 * | 3/2008 | Okamura | A63F 13/42 |
| | | | 463/34 |

(Continued)

FOREIGN PATENT DOCUMENTS

| | | |
|---|---|---|
| JP | 3917456 | 2/2007 |
| JP | 2008-049117 | 3/2008 |
| JP | 2009-134572 | 6/2009 |

OTHER PUBLICATIONS

Office Action dated Jan. 6, 2020 issued in Japanese Application No. 2019-132903 (6 pgs.).

*Primary Examiner* — Jason T Yen
(74) *Attorney, Agent, or Firm* — Nixon & Vanderhye PC

(57) ABSTRACT

A first sensor detects a movement of a first apparatus attached to a lower body of a user, and a second sensor detects a movement of a second apparatus attached to an upper body of the user or held by a hand of the user. Then, a virtual object is caused to continue a first action in a virtual space while received outputs from the first sensor and the second sensor both satisfy a condition.

21 Claims, 23 Drawing Sheets

(56) References Cited

U.S. PATENT DOCUMENTS

| | | | |
|---|---|---|---|
| 2009/0144020 A1 | 6/2009 | Ohta et al. | |
| 2009/0322763 A1* | 12/2009 | Bang | G06V 40/23 |
| | | | 73/865.4 |
| 2010/0151948 A1* | 6/2010 | Vance | A63F 13/10 |
| | | | 463/43 |
| 2010/0304867 A1* | 12/2010 | Nicolas | A63F 13/812 |
| | | | 463/37 |
| 2015/0030305 A1* | 1/2015 | Moon | A63F 13/211 |
| | | | 386/230 |
| 2019/0106190 A1* | 4/2019 | Schibli | B63H 20/007 |
| 2021/0016160 A1 | 1/2021 | Kitahara | |

* cited by examiner

F I G. 7
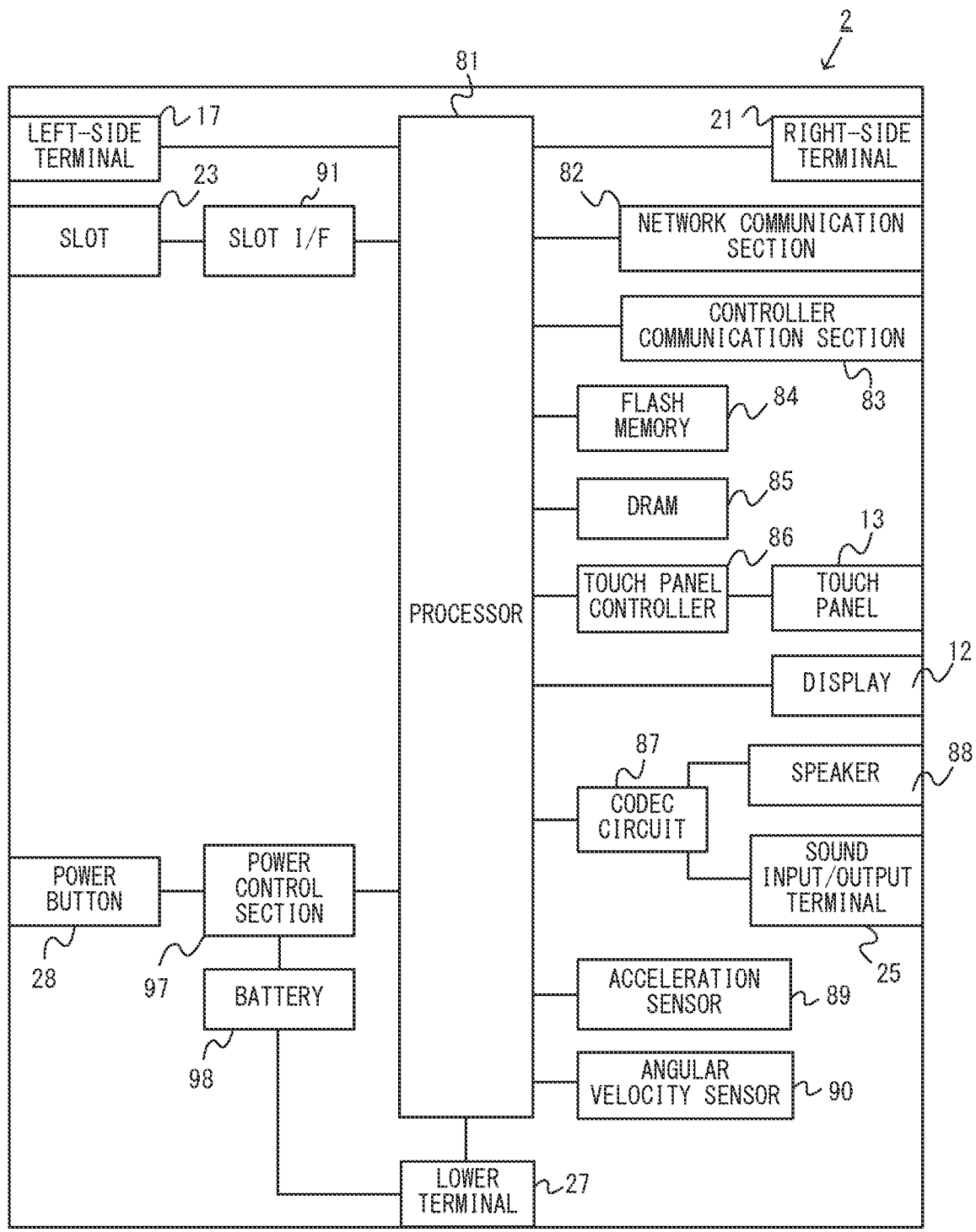

CAN BE ACCOMMODATED

F I G. 2 1
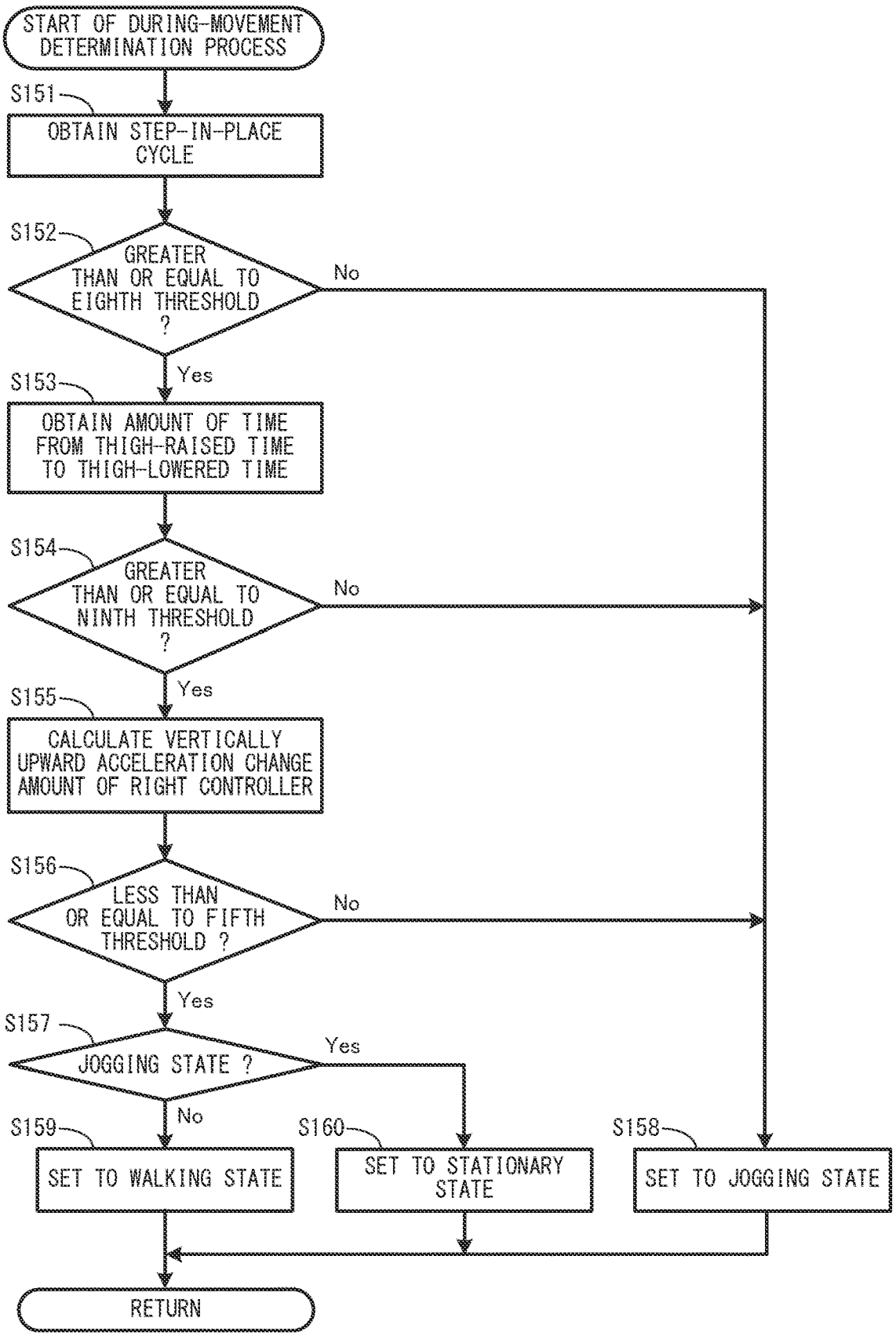

INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATION

This application is a continuation of application Ser. No. 16/702,177 filed on Dec. 3, 2019, which claims priority to Japanese Patent Application No. 2019-132903 filed on Jul. 18, 2019, the entire contents of each of which are hereby incorporated by reference in this application.

FIELD

The technology disclosed herein relates to an information processing system, a storage medium storing an information processing program, an information processing apparatus and an information processing method, with which it is possible to perform a process of causing a virtual object to act in accordance with a user operation.

BACKGROUND AND SUMMARY

A conventional information processing apparatus has been disclosed in the art that is capable of executing game processes by using the output of an apparatus held by the user and the output of an apparatus that is stepped on by the user.

With the information processing apparatus, however, the output from the apparatus held by the user and the output from the apparatus stepped on by the user are separately used for game control, and there is room for improvement to encourage the user of these apparatuses to perform whole body exercises.

It is therefore an object of the present embodiment to provide an information processing system, a storage medium storing an information processing program, an information processing apparatus and an information processing method, with which it is possible to encourage the user of apparatuses to perform whole body exercises.

The present embodiment may employ the following configurations to attain the object set forth above. Note that in interpreting the claims, it is understood that the scope thereof should be interpreted based solely on the wording of the claims, and wherever the wording of the claims is inconsistent with the description hereinbelow, the wording of the claims precedes.

An example configuration of an information processing system of the present embodiment includes a first apparatus, a second apparatus and an information processing apparatus. The first apparatus includes a first sensor and a first transmitter. The first sensor is configured to detect a movement of the first apparatus attached to a lower body of a user. The first transmitter is configured to transmit an output of the first sensor. The second apparatus includes a second sensor and a second transmitter. The second sensor is configured to detect a movement of the second apparatus attached to an upper body of the user or held by a hand of the user. The second transmitter is configured to transmit an output of the second sensor. The information processing apparatus includes a computer configured to: receive the outputs transmitted from the first sensor and the second sensor; and cause a virtual object to continue to perform a first action in a virtual space while the received outputs from the first sensor and the second sensor both satisfy a condition.

According to the description above, it is possible to promote operations using the whole body of the user. Since the action of the virtual object can be controlled by using a combination of both of the output from the first apparatus and the output from the second apparatus, it is possible to increase the variety of actions that can be performed by the virtual object.

The first action of the virtual object may be a movement of the virtual object in the virtual space.

According to the description above, since the movement of the virtual object requires the movement not only of the lower body of the user but also of the upper body of the user, it is possible to promote operations using the movement of the whole body of the user, thus realizing something close to a state where the user also moves the upper body while walking in real life.

For the continuation of the first action, the movement of the virtual object may be continued while the output transmitted from the first sensor indicates that the first apparatus is moving and the output transmitted from the second sensor indicates that the second apparatus is moving.

According to the description above, it is possible to urge the user to continue moving the whole body in order to continue the movement of the virtual object.

For the continuation of the first action, in a state where the movement of the virtual object is continued with the outputs from the first sensor and the second sensor both satisfying the condition, the virtual object may be caused to perform a second action while continuing the movement further based on the output from the second sensor.

According to the description above, it is possible to improve the playability by increasing the variety of actions of the virtual object by also enabling a different action of the virtual object based only on the second sensor while the virtual object is moving based on the first and second sensor outputs. Moreover, by requiring the user to perform an operation that requires an action different from that for moving the virtual object, it is possible to urge the user to perform another operation while the user is performing an operation using the whole body.

For the continuation of the first action, the virtual object may be caused to perform the second action based only on the output from the second sensor, of the outputs from the first sensor and the second sensor.

According to the description above, it is possible to simplify the control by the operation that requires an action different from that for moving the virtual object, and it is possible to lower the difficulty level of that operation.

For the continuation of the first action, in a state where the movement of the virtual object is continued with the outputs from the first sensor and the second sensor both satisfying the condition, a moving speed of the virtual object is changed further based only on the output from the first sensor, of the outputs from the first sensor and the second sensor.

According to the description above, the moving speed of the virtual object changes in accordance with the operation performed by using the lower body, and it is therefore possible to reduce the awkwardness to be felt by the user performing operations. While the second sensor may possibly be moved by an operation different from the operation of using the lower body of the user in order to produce an output in accordance with the different operation, it is possible to prevent the moving speed from being changed without the intention by the user since the control of the moving speed is not based on the output.

For the continuation of the first action, in a state where the virtual object has stopped moving in the virtual space, the movement of the virtual object in the virtual space may be started when the received outputs from the first sensor and the second sensor both satisfy a start-of-movement condition that is different from the condition.

According to the description above, in a state where the user has already moved and the virtual object has already started moving, a condition is set that is different from the determination condition of the sensor output that is used when the user and the virtual object start moving from the stationary state, and it is therefore possible to appropriately determine actions for the different circumstances.

Moving actions of the virtual object in the virtual space may include at least a walking action of a relatively slow moving speed, and a jogging action of a relatively fast moving speed. In such a case, for the continuation of the first action, in a state where the virtual object has stopped moving in the virtual space, it is determined, by using outputs from the first sensor and the second sensor for a first period of time, whether an action with which the movement of the virtual object in the virtual space is started is to be the walking action or the jogging action; and in a state where the virtual object is continuing to move in the virtual space, it is determined, by using the outputs from the first sensor and the second sensor for a second period of time longer than the first period of time, whether the moving action of the virtual object in the virtual space is to be the walking action or the jogging action.

According to the description above, it is possible to relatively early make the determination of the sensor output when the user and the virtual object start moving from the stationary state, and it is possible to reduce the awkwardness to be felt by the user in such circumstances.

The first sensor may be capable of detecting at least an angular velocity acting upon the first apparatus. For the continuation of the first action, a determination regarding a start of movement of the virtual object in the virtual space is made, by using at least the received angular velocity detected by the first sensor, in a state where the virtual object has stopped moving in the virtual space.

According to the description above, it is possible to make an accurate determination even under circumstances where the determination is difficult only with the acceleration.

Moving actions of the virtual object in the virtual space may include at least a walking action of a relatively slow moving speed, and a jogging action of a relatively fast moving speed. The first sensor may be capable of detecting an angular velocity and an acceleration acting upon the first apparatus. In such a case, for the continuation of the first action, a moving speed of the virtual object in the jogging action may be controlled by using the received acceleration detected by the first sensor; and the walking action and the jogging action of the virtual object may be switched from one to another by using the received angular velocity detected by the first sensor.

According to the description above, by employing different controls for switching between different types of moving actions and for adjusting the moving speed, it is possible to realize fine controls appropriate for the respective characteristics.

The first sensor may be capable of detecting at least an angular velocity and an acceleration acting upon the first apparatus. For the continuation of the first action, a first mode and a second mode may be switched from one another, wherein the movement of the virtual object is controlled based on changes in the acceleration acting upon the first apparatus in the first mode, and the movement of the virtual object may be controlled based on changes in a parameter other than the acceleration acting upon the first apparatus; and for the continuation of the first action, a moving speed of the virtual object may be changed in accordance with an amount of change in the acceleration detected by the first sensor in the first mode, and the moving speed of the virtual object may be changed in accordance with an amount of change in the angular velocity detected by the first sensor in the second mode.

According to the description above, it is possible to appropriately reflect the amount of motion of the user, and it is possible to appropriately determine the level of the exercise even if the user is exercising while aiming to reduce noise from performing operations, for example.

Moving actions of the virtual object in the virtual space may include at least a low-speed moving action of a relatively slow moving speed and a high-speed moving action of a relatively high moving speed. For the continuation of the first action, the user of the first apparatus and the second apparatus is prompted to perform an operation of causing the virtual object to perform the low-speed moving action and an operation of causing the virtual object to perform the high-speed moving action, and a threshold used to distinguish between the operation of causing the virtual object to perform the low-speed moving action and the operation of causing the virtual object to perform the high-speed moving action is set based on outputs from the first sensor of the first apparatus and the second sensor of the second apparatus. For the continuation of the first action, in a state where the virtual object is continuing to move in the virtual space, it may be determined whether the moving action of the virtual object in the virtual space is the low-speed moving action or the high-speed moving action by using the received outputs from the first sensor and the second sensor and the threshold.

According to the description above, it is possible to perform a control in accordance with the athletic ability of the user.

The virtual object may be rendered so that movements thereof in the virtual space are realized by movements of a leg or an arm. For the continuation of the first action, in a state where the virtual object is continuing to move in the virtual space, a timing of an action of a leg or an arm of the virtual object is determined by using the output of the first sensor and/or the output of the second sensor.

According to the description above, the movement of the user and the movement of the virtual object can be synchronized together, and the determination of the movement itself of the virtual object and the determination as to how to render the virtual object are separate from each other, and it is therefore possible to render the movement itself and the manner of movement in accordance with the actual movement of the user.

In the determination of the timing, a timing of an action of a leg of the virtual object may be determined by using the output of the first sensor and a timing of an action of an arm of the virtual object may be determined by using the output of the second sensor.

According to the description above, the action of the leg of the virtual object and the action of the arm of the virtual object are determined by using different sensor outputs, and the virtual object is rendered based on these determinations. Thus, it is possible to render the virtual object while the movement of the upper body of the user and the movement of the lower body of the user are synchronized with each other.

The first apparatus may be attached to a thigh of the user. In the determination of the timing, a timing of an action of a leg of the virtual object may be determined by using changes in inclination of the first apparatus indicated by the output of the first sensor.

According to the description above, it is possible to easily monitor raising and lowering of the thigh of the user using the first sensor of the first apparatus, and it is possible to realize rendering of a virtual object that is well correlated with the movement of the thigh.

The second action may be an action of changing a direction of at least an upper body of the virtual object in a state where the virtual object is continuing to move in the virtual space. The second sensor may be capable of detecting an angular velocity and an acceleration acting upon the second apparatus. For the continuation of the first action, the second action may be controlled by using an output that indicates both the received angular velocity and acceleration detected by the second sensor.

According to the description above, since the direction of the virtual object is changed by using both of the angular velocity and the acceleration that occur in accordance with the movement of the upper body of the user, it is possible to accurately control the direction of the virtual object.

The present embodiment may be carried out as a storage medium storing an information processing program, an information processing apparatus, and an information processing method.

According to the present embodiment, it is possible to promote operations using the movement of the whole body of the user. Since the action of the virtual object can be controlled by using a combination of both of the output from the first apparatus and the output from the second apparatus, it is possible to increase the variety of actions that can be performed by the virtual object.

These and other objects, features, aspects and advantages will become more apparent from the following detailed description when taken in conjunction with the accompanying drawings.

BRIEF DESCRIPTION OF THE DRAWINGS

FIG. 7 is a block diagram showing a non-limiting example of an internal configuration of the main body apparatus 2;

FIG. 21 is a sub-routine showing a detailed non-limiting example of a during-movement determination process performed in step S108 of FIG. 18;

DETAILED DESCRIPTION OF NON-LIMITING EXAMPLE EMBODIMENTS

Figure 1:
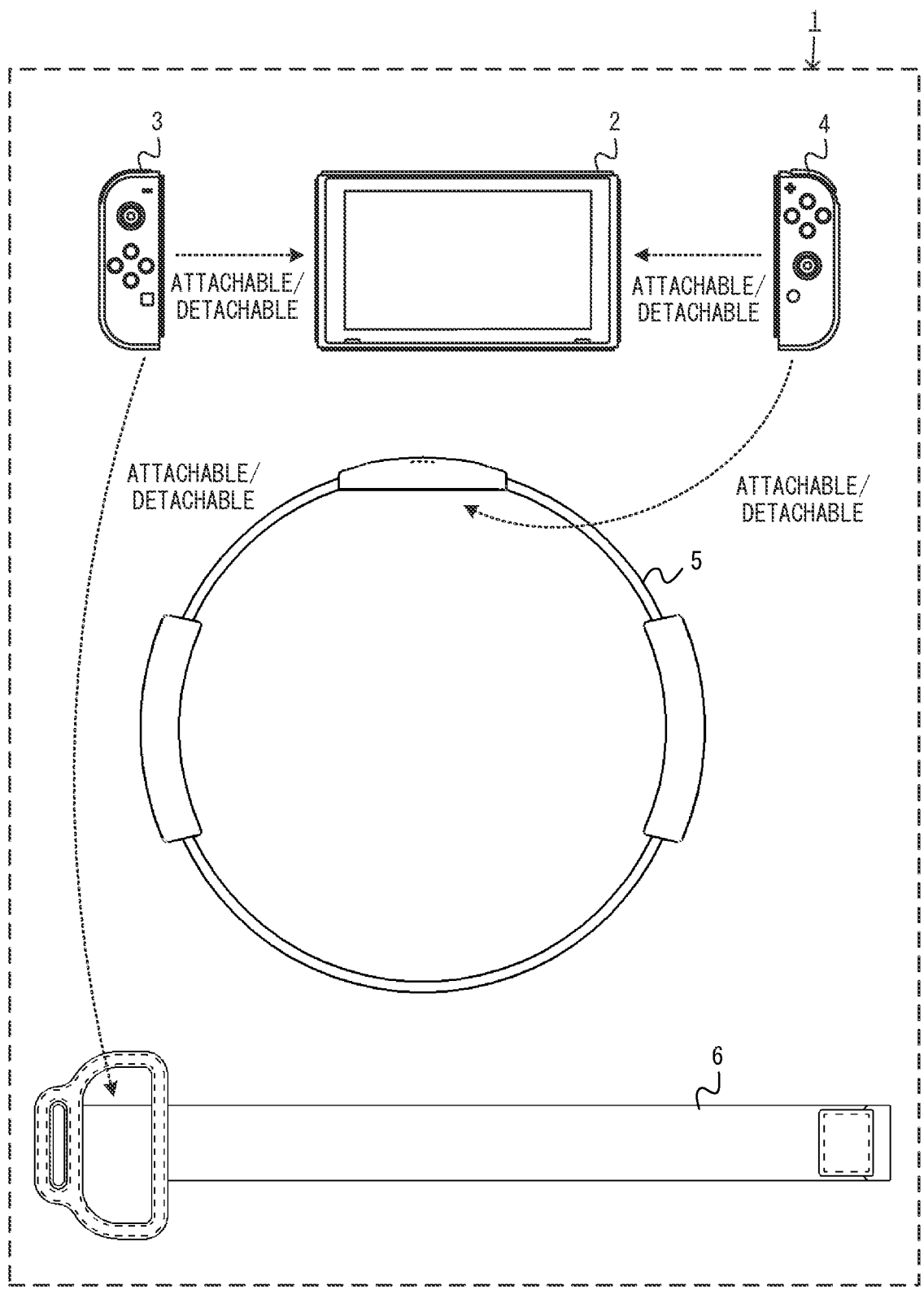
FIG. 1 is a diagram showing a non-limiting example of apparatuses included in a game system 1.

An information processing system according to the present embodiment will be described. A game system 1 is used as an example information processing system of the present embodiment. FIG. 1 is a diagram showing an example of apparatuses included in the game system 1. As shown in FIG. 1, a game system 1 includes a main body apparatus 2, a left controller 3, a right controller 4, a ring-shaped extension apparatus 5, and a belt-shaped extension apparatus 6.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. The belt-shaped extension apparatus 6 is an example of an extension apparatus for use with the left controller 3. The belt-shaped extension apparatus 6 is used with the left controller 3 attached to the belt-shaped extension apparatus 6. Thus, in the present embodiment, the user can use the controllers 3 and 4 while attached to the respective extension apparatuses (see FIG. 12). Note that the ring-shaped extension apparatus 5 is not limited for use with the right controller 4, but the left controller 3 may be attachable thereto. The belt-shaped extension apparatus 6 is not limited for use with the left controller 3, but the right controller 4 may be attached thereto. Note that although the ring-shaped extension apparatus 5 and the belt-shaped extension apparatus 6 serve as extension apparatuses capable of extending or changing the functionality and/or the use of the right controller 4 and the left controller 3 as will be described below, they may be referred to simply as peripheral apparatuses.

Figure 2:
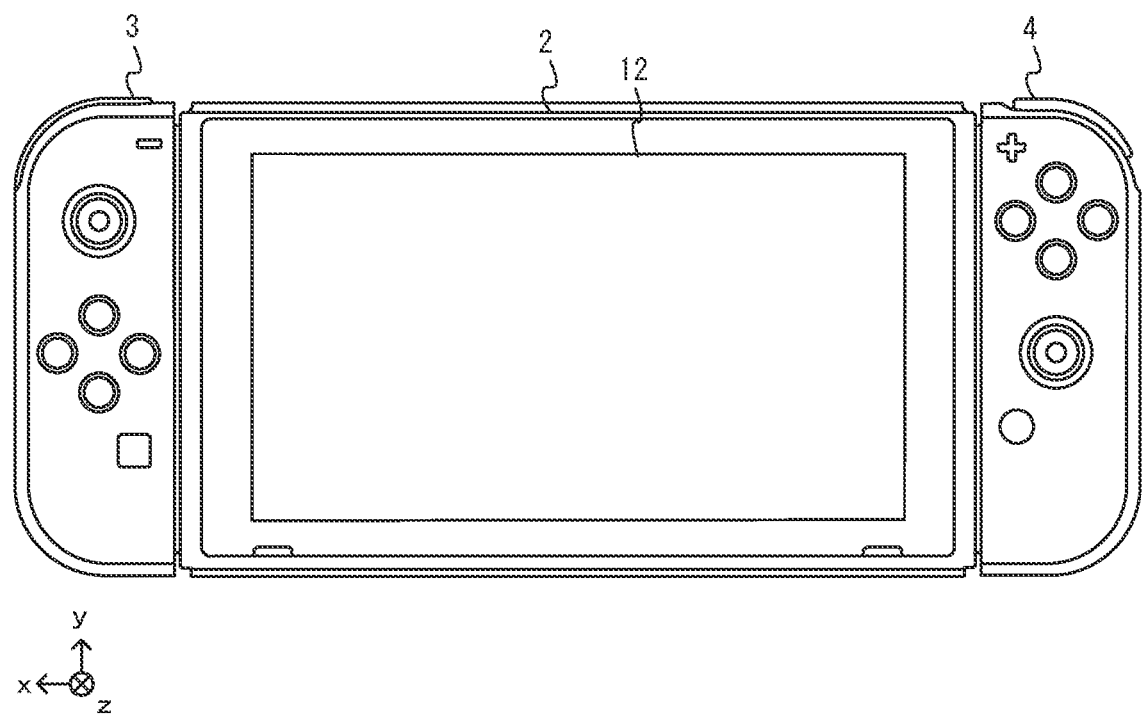
FIG. 2 is a diagram showing a non-limiting example of a left controller 3 and a right controller 4 attached to a main body apparatus 2.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
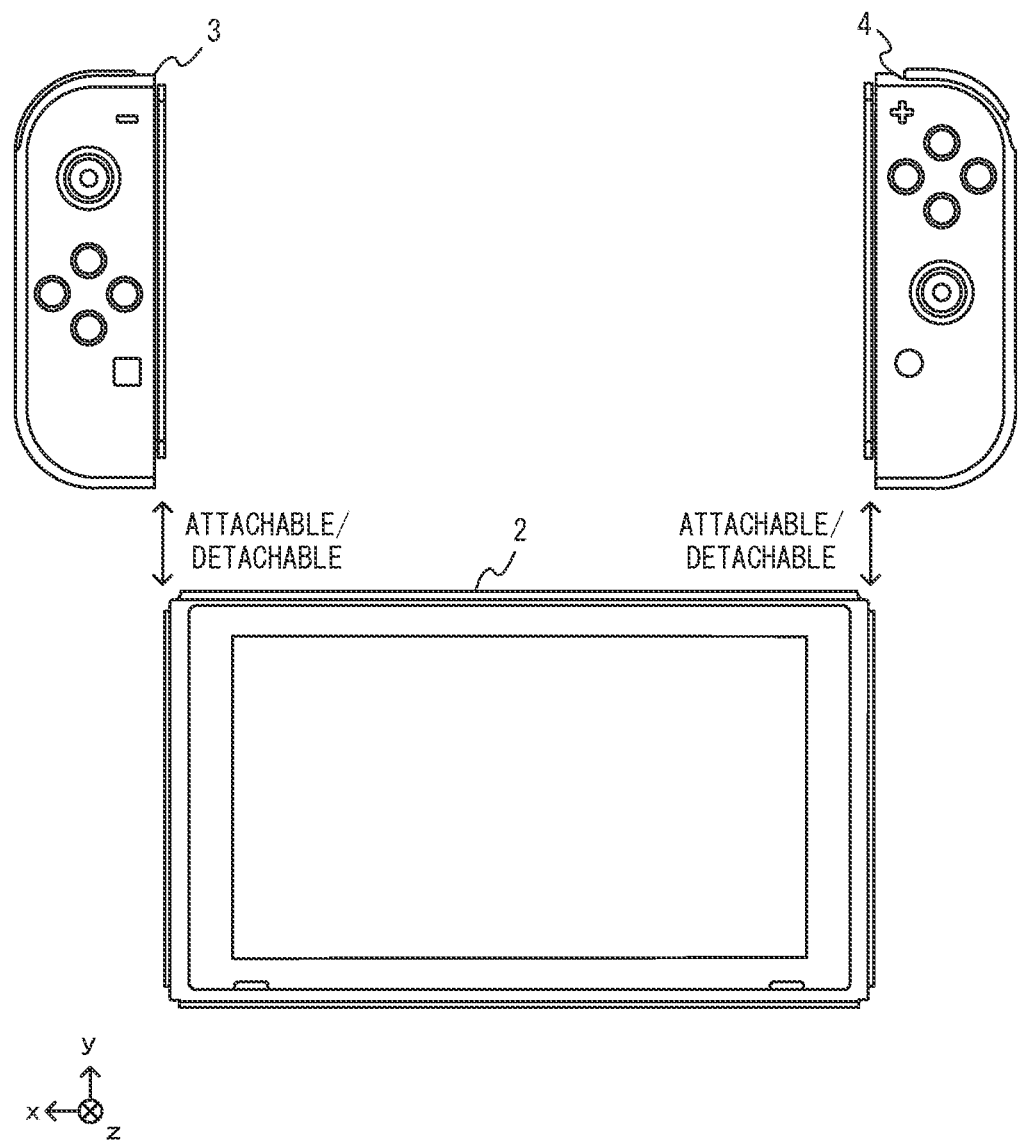
FIG. 3 is a diagram showing a non-limiting example of the left controller 3 and the right controller 4 detached from the main body apparatus 2.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
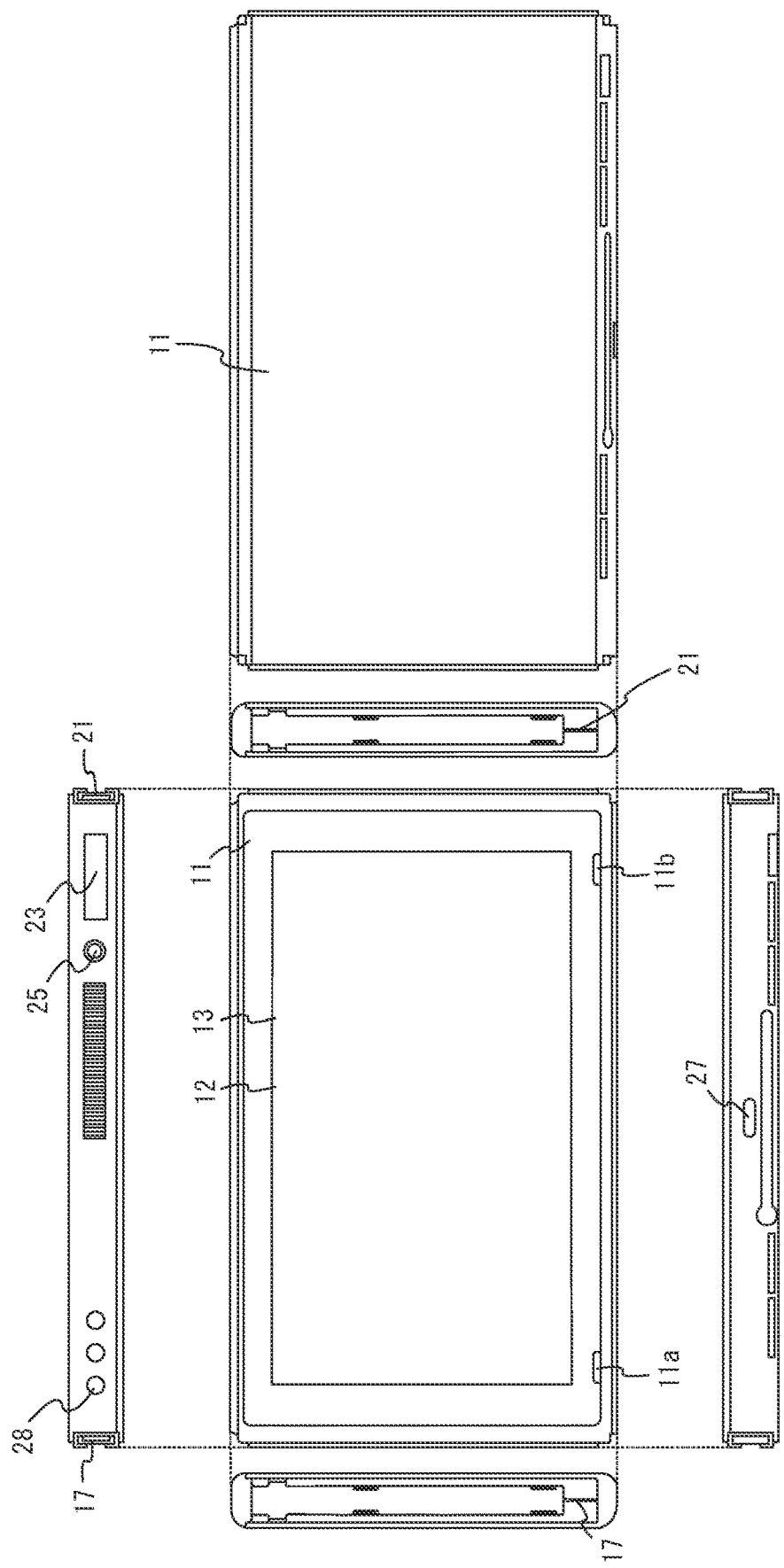
FIG. 4 is six orthogonal views showing a non-limiting example of the main body apparatus 2.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

The main body apparatus 2 includes a left-side terminal 17 that enables wired communication between the main body apparatus 2 and the left controller 3, and a right-side terminal 21 that enables wired communication between the main body apparatus 2 and the right controller 4.

Figure 5:
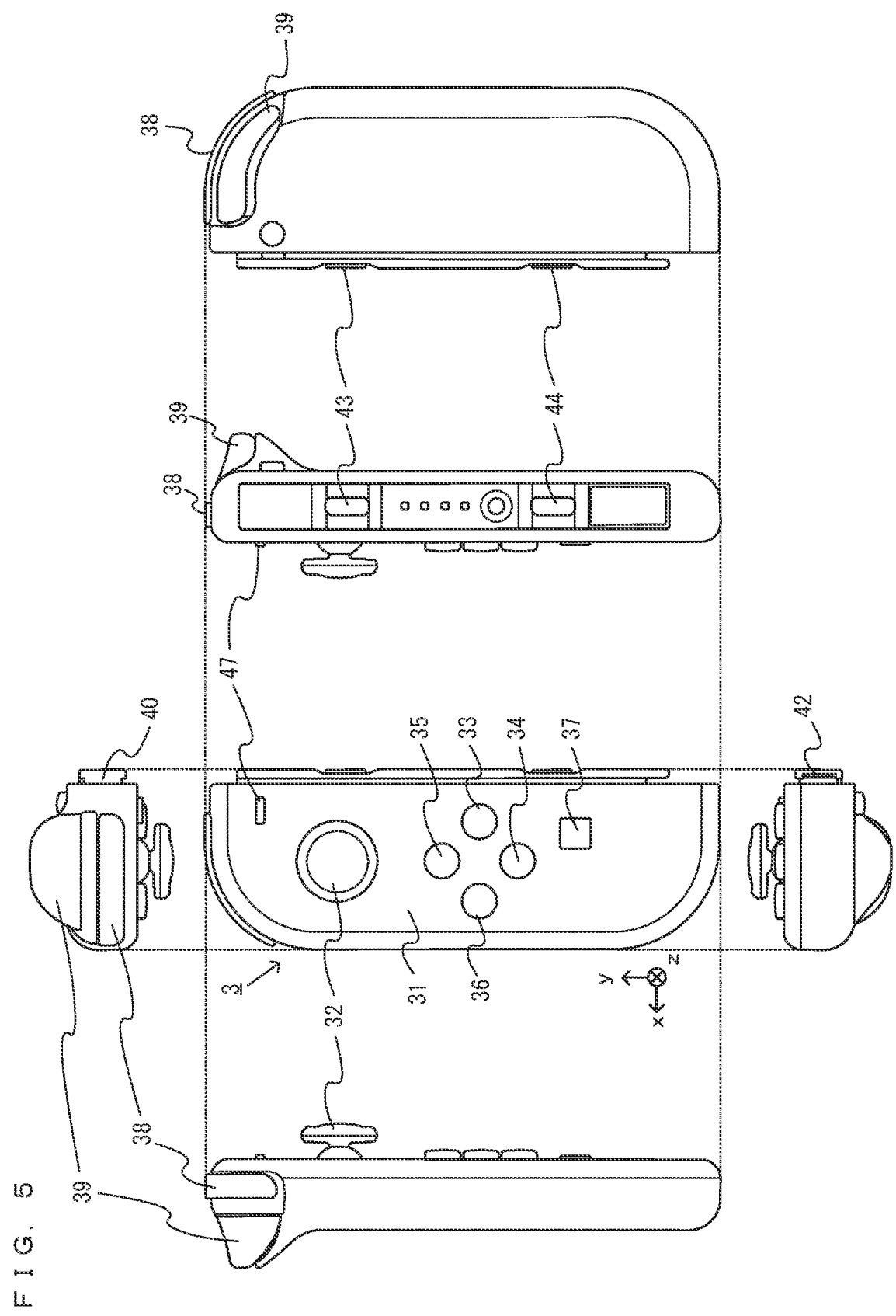
FIG. 5 is six orthogonal views showing a non-limiting example of the left controller 3.

FIG. 5 is six orthogonal views showing an example of the left controller 3. As shown in FIG. 5, the left controller 3 includes a housing 31. In the exemplary embodiment, the housing 31 has a vertically long shape, i.e., is shaped to be long in an up-down direction (i.e., a y-axis direction shown in FIGS. 2 and 5). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input device with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input device, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 includes a terminal 42 that enables wired communication between the left controller 3 and the main body apparatus 2.

Figure 6:
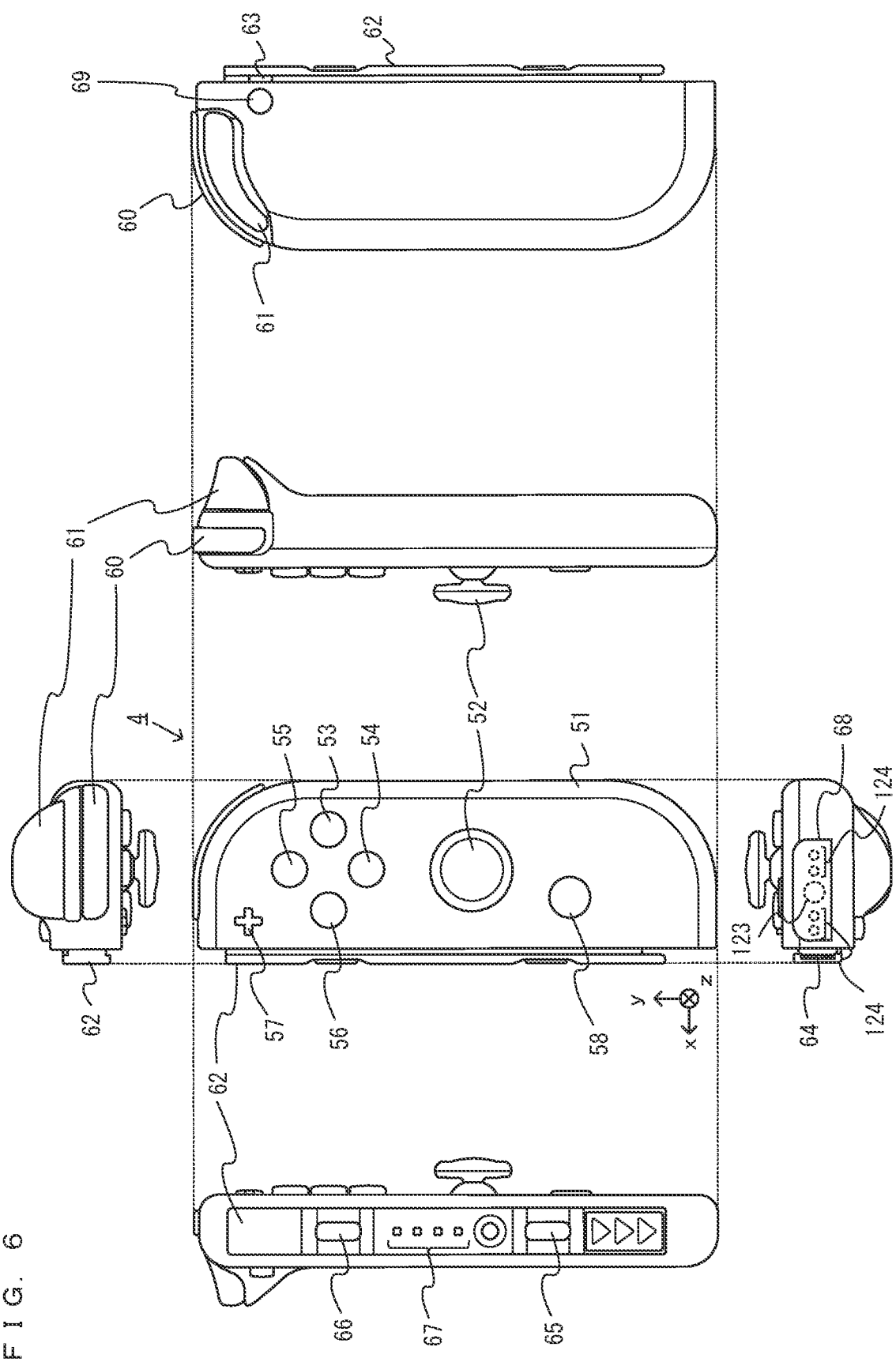
FIG. 6 is six orthogonal views showing a non-limiting example of the right controller 4.

FIG. 6 is six orthogonal views showing an example of the right controller 4. As shown in FIG. 6, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input device. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

The right controller 4 includes a terminal 64 that enables wired communication between the right controller 4 and the main body apparatus 2.

FIG. 7 is a block diagram showing an example of the internal configuration of the main body apparatus 2. The main body apparatus 2 includes components 81 to 91, 97, and 98 shown in FIG. 7 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external device via a network. In the exemplary embodiment, as a first communication form, the network communication section 82 connects to a wireless LAN and communicates with an external device, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main unites 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Figure 8:
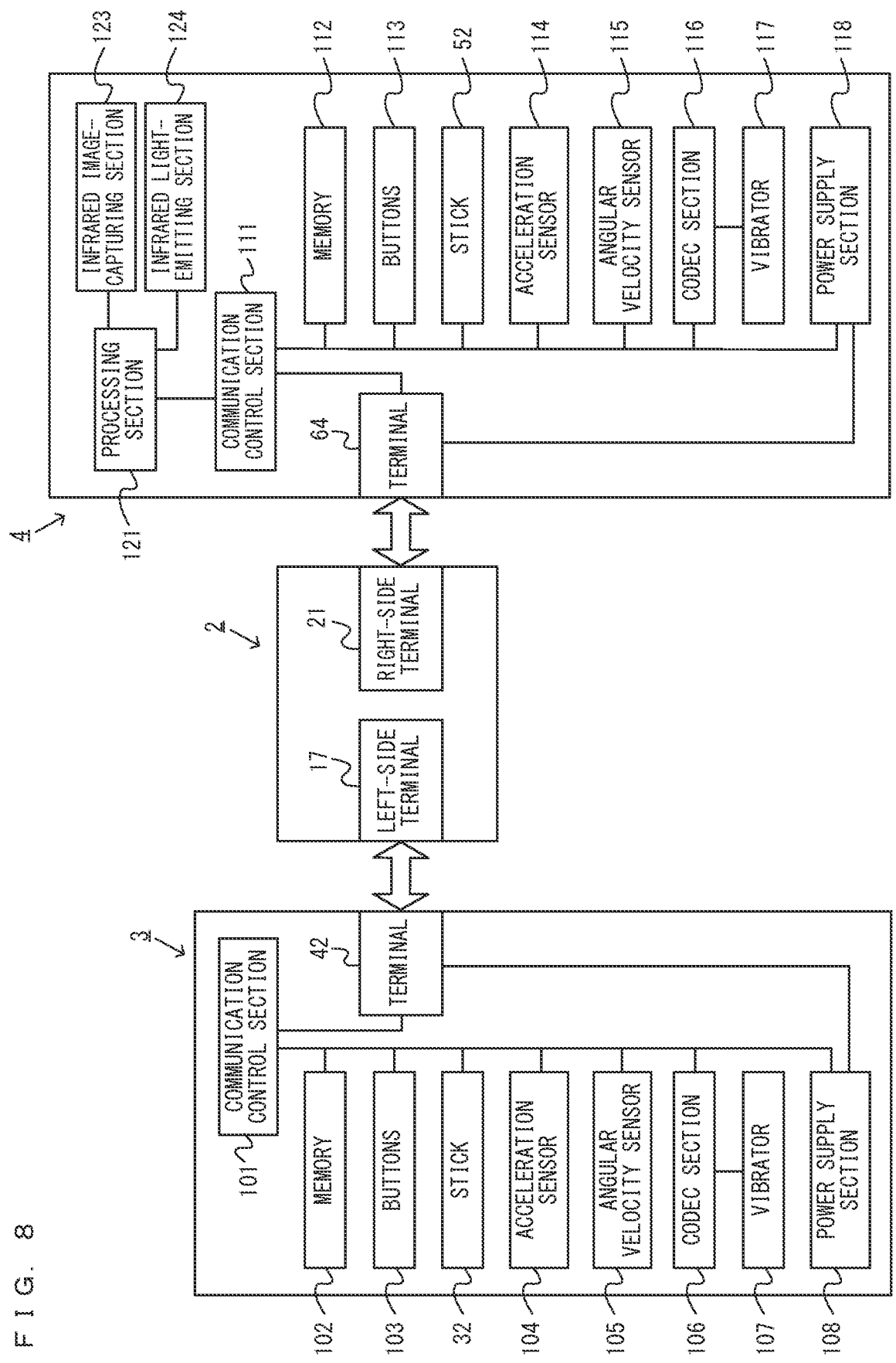
FIG. 8 is a block diagram showing a non-limiting example of an internal configuration of the main body apparatus 2, the left controller 3 and the right controller 4.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44 and 47). Further, the left controller 3 includes the analog stick ("stick" in FIG. 8) 32. Each of the buttons 103 and the analog stick 32 outputs information regarding an operation performed on itself to the communication control section 101 repeatedly with appropriate timing.

The left controller 3 includes inertial sensors. Specifically, the left controller 3 includes an acceleration sensor 104. Further, the left controller 3 includes an angular velocity sensor 105. In the exemplary embodiment, an acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly with appropriate timing.

The communication control section 101 acquires information regarding an input (specifically, information regarding an operation, or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by way of vibrations. In the exemplary embodiment, the vibrator 107 is controlled by a command from the main body apparatus 2.

The left controller 3 includes a power supply section 108. In the exemplary embodiment, the power supply section 108 includes a battery and a power control circuit. Although not shown in the figures, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2. Note that the communication control section 111 is an example of the second transmitter.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes the vibrator 117, as does the left controller 3.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Figure 9:
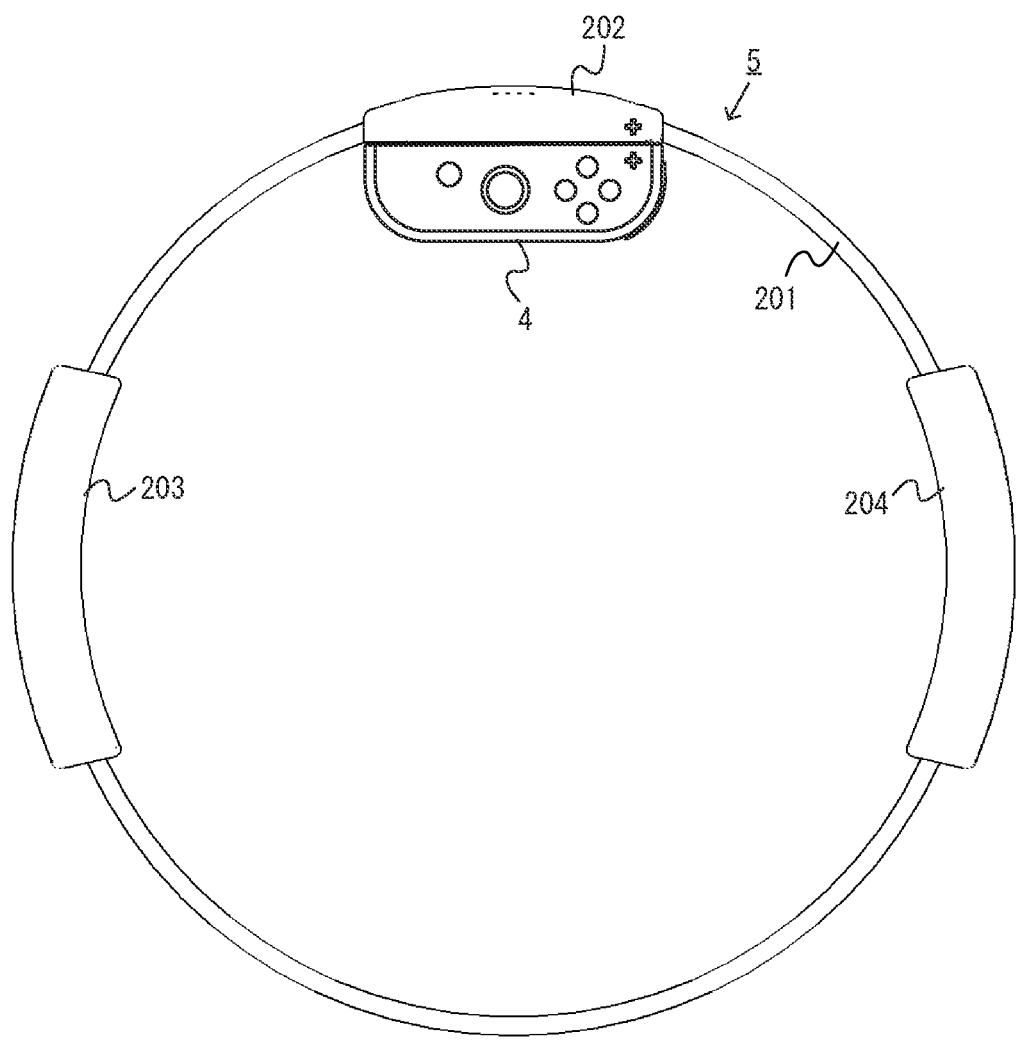
FIG. 9 is a diagram showing a non-limiting example of a ring-shaped extension apparatus.

FIG. 9 is a diagram showing an example of a ring-shaped extension apparatus. Note that FIG. 9 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example. The user can perform operations on the ring-shaped extension apparatus 5 for example by stepping in place or bending and stretching the knee while holding the ring-shaped extension apparatus 5 by both hands. Moreover, the user can perform operations on the ring-shaped extension apparatus 5 for example by directing the ring-shaped extension apparatus 5 toward a desired direction while holding the ring-shaped extension apparatus 5 by both hands. Note that the ring-shaped extension apparatus 5 held by the user is an example of the second apparatus. The acceleration sensor 114 and/or the angular velocity sensor 115 of the right controller 4 are an example of the second sensor.

As shown in FIG. 9, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 6). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 includes grip covers 203 and 204. The grip covers 203 and 204 are components to be held by the user. In the present embodiment, the grip covers 203 and 204 can be removed from the ring-shaped portion 201. In the present embodiment, the left grip cover 203 is provided on the left grip portion near the left end of the ring-shaped portion 201, and the right grip cover 204 is provided on the right grip portion near the right end of the ring-shaped portion 201. Note that there is no limitation on the number of grip portions, and the grip portions may be provided at three or more locations, or at only one location, depending on the operation method or methods contemplated. Depending on the content of the game (or the content of the fitness exercise operation to be performed by the user in the game), only a particular one or particular ones of a plurality of grip portions may be held by one hand or both hands.

Figure 10:
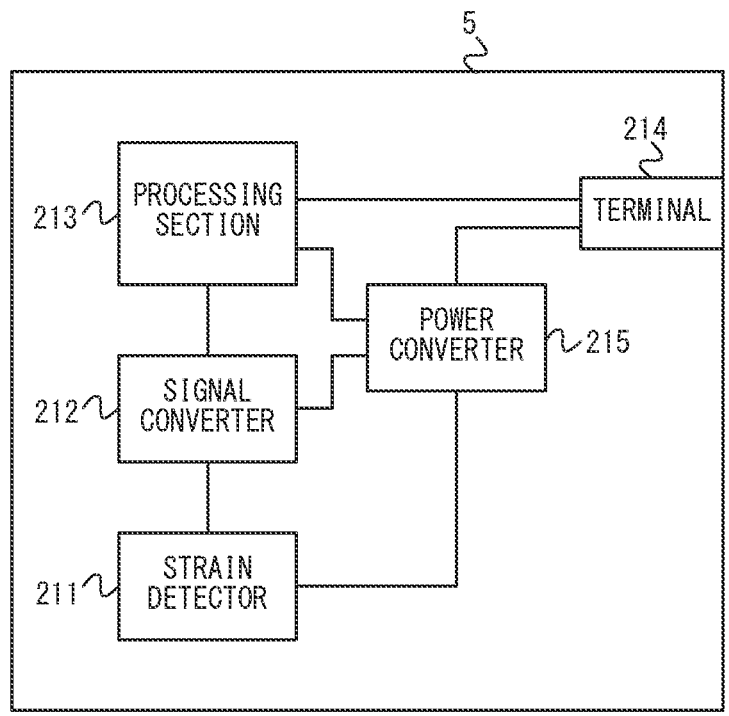
FIG. 10 is a block diagram showing a non-limiting electrical connection relationship between components of the ring-shaped extension apparatus 5.

FIG. 10 is a block diagram showing an electrical connection relationship between components of the ring-shaped extension apparatus 5. As shown in FIG. 10, the ring-shaped extension apparatus 5 includes a strain detector 211. The strain detector 211 is an example of a detector that detects deformation of the ring-shaped portion 201. In the present embodiment, the strain detector 291 includes a strain gauge. The strain detector 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 9 since the base portion is provided inside the main portion 202. The base portion is made of a material having a higher rigidity than the elastic member. For example, the elastic member is made of a resin (specifically, an 1-RP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detector 211 may include, instead of the strain gauge, any sensor that is capable of detecting the deformation of the ring-shaped portion 201 from the normal state. For example, the strain detector 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal converter 212. In the present embodiment, the signal converter 212 includes an amplifier and an AD converter. The signal converter 212 is electrically connected to the strain detector 211 so as to amplify the output signal from the strain detector 211 through the amplifier and performs an AD conversion through the AD converter. The signal converter 212 outputs a digital signal representing the strain value. Note that in other embodiments, the signal converter 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal converter 212, and the output signal from the signal converter 212 is input to the processing section 213. The ring-shaped extension apparatus 5 includes the terminal 214. The terminal 214 is electrically connected to the processing section 213. When the right controller 4 is attached to the ring-shaped extension apparatus 5, a processing section 213 sends information representing the strain value that is represented by the output signal from the signal converter 212 (in other words, the ring operation data) to the right controller 4 through the terminal 214.

The ring-shaped extension apparatus 5 includes a power converter 215. The power converter 215 is electrically connected to the sections 211 to 214. The power converter 215 supplies power, which is supplied from the outside (i.e., the right controller 4) through the terminal 214, to the sections 211 to 214. The power converter 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
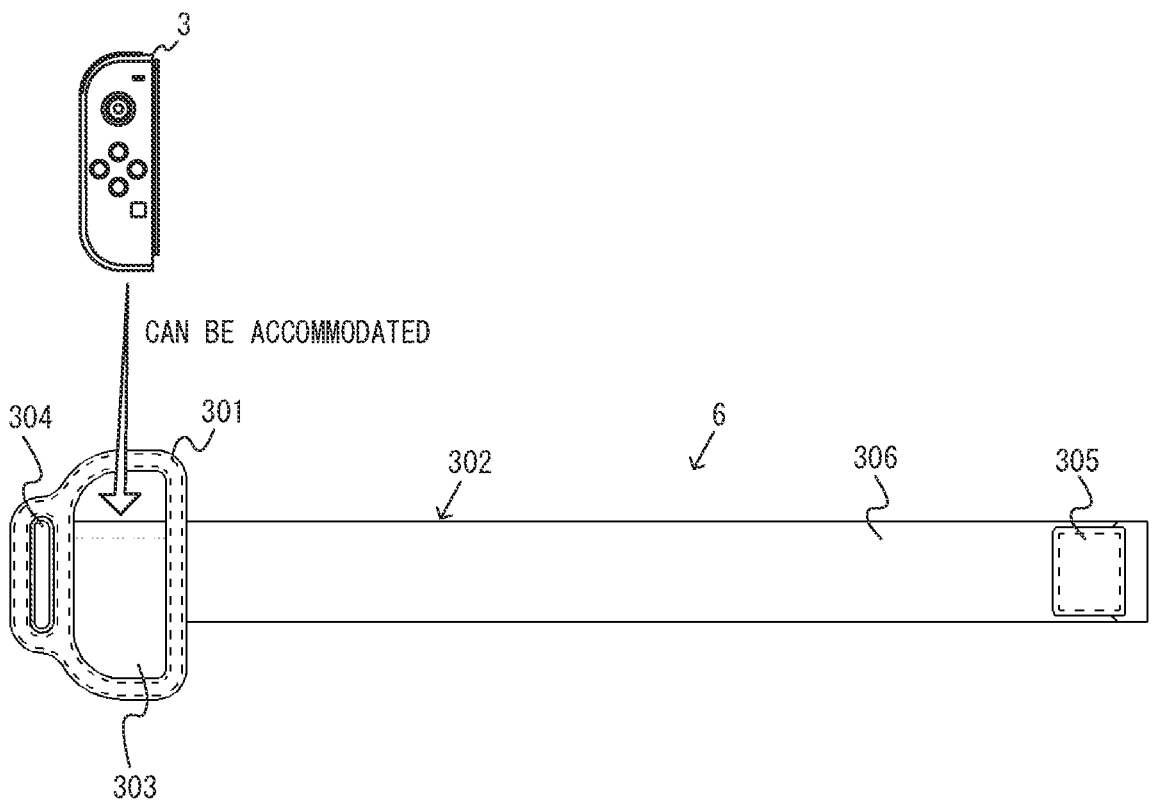
FIG. 11 is a diagram showing an example of a belt-shaped extension apparatus 6.

FIG. 11 is a diagram showing an example of a belt-shaped extension apparatus. The belt-shaped extension apparatus 6 is fastened to a leg of the user with the left controller 3 attached thereto (see FIG. 12). As shown in FIG. 11, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. In the present embodiment, as the left controller 3 is accommodated in the accommodating portion 301, the left controller 3 is attached to the belt-shaped extension apparatus 6. Note that in other embodiments, there is no limitation on the configuration for attaching the left controller 3 to the belt-shaped extension apparatus 6.

The accommodating portion 301 includes a through hole 304 on one side of the pocket portion 303. The belt portion 302 is provided on one side of the pocket portion 303 of the accommodating portion 301, i.e., on the opposite side from the through hole 304 with respect to the pocket portion 303. The belt portion 302 has a band shape, and one end thereof is secured to the accommodating portion 301. In the present embodiment, the belt portion 302 is made of a flexible material (e.g., a woven rubber).

A first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. The first touch fastener 305 and the second touch fastener 306 can be attached to and detached from each other. For example, the first touch fastener 305 may be a hook-surface touch fastener, and the second touch fastener 306 is a loop-surface touch fastener.

When fastening the belt-shaped extension apparatus 6, the user passes the belt portion 302 through the through hole 304, with the belt portion 302 wound around a leg (e.g., the left thigh), and the user fastens together the first touch fastener 305 and the second touch fastener 306. Thus, the user can fasten the belt-shaped extension apparatus 6, with the left controller 3 attached thereto, to a leg (the left thigh) (see FIG. 12). Note that the belt-shaped extension apparatus 6 fastened to a leg of the user is an example of the first apparatus. The acceleration sensor 104 and/or the angular velocity sensor 105 of the left controller 3 are an example of the first sensor. Note that where the left controller 3 itself is attached to the lower body of the user (e.g., put in a pocket of a garment worn on the lower body of the user or under the belt of the user) without being attached to the belt-shaped extension apparatus 6, the left controller 3 itself is an example of the first apparatus.

Figure 12:
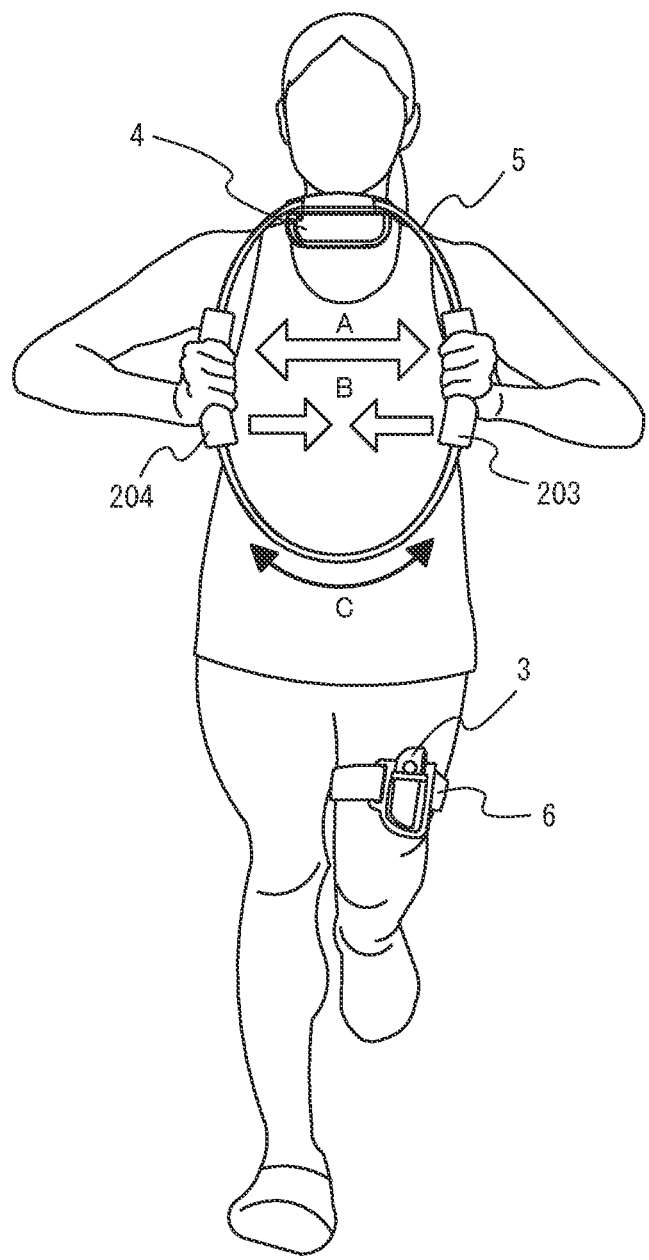
FIG. 12 is a diagram showing a non-limiting example of how the ring-shaped extension apparatus 5 and the belt-shaped extension apparatus 6 are used by the user.

FIG. 12 is a diagram showing an example of how the ring-shaped extension apparatus 5 and the belt-shaped extension apparatus 6 are used by the user. As shown in FIG. 12, the user can play a game using two extension apparatuses 5 and 6 in addition to a game apparatus (i.e., the main body apparatus 2 and the controllers 3 and 4). For example, the user can use the ring-shaped extension apparatus 5 and the belt-shaped extension apparatus 6 as a set.

For example, as shown in FIG. 12, the user holds the ring-shaped extension apparatus 5 with the right controller 4 attached thereto with both hands, and fastens the belt-shaped extension apparatus 6 with the left controller 3 attached thereto to a leg (e.g., the left thigh). The user can play a game by performing an operation using the ring-shaped extension apparatus 5 (e.g., an operation of deforming the ring-shaped extension apparatus 5 and an operation of moving the ring-shaped extension apparatus 5), and performing an operation of moving the leg to which the belt-shaped extension apparatus 6 is fastened.

Note that FIG. 12 shows an example of how the user holds the grip covers 203 and 204 and deforms the ring-shaped extension apparatus 5. Through this action, the user can perform, as a game operation, a fitness exercise operation of training the arms. As an example action of deforming the ring-shaped extension apparatus 5, the user can perform an operation (pull operation) of deforming the ring-shaped extension apparatus 5 in a direction (the direction A in the figure) such that the grip covers 203 and 204 move away from each other. As another example action of deforming the ring-shaped extension apparatus 5, the user can perform an operation (push operation) of deforming the ring-shaped extension apparatus 5 in a direction (the direction B in the figure) such that the grip covers 203 and 204 move toward each other. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles.

Note that FIG. 12 illustrates an operation by the user stepping in place or bending and stretching the knee, with the grip covers 203 and 204 held by both hands and with the belt-shaped extension apparatus 6 attached to the left thigh. Through this action, the user can perform, as a game operation, the action of walking or running Through this action, the user can perform, as a game operation, a fitness exercise operation of training the leg muscles. The user can perform, as a game operation, the action of moving the direction of the ring-shaped extension apparatus 5 being held by both hands, up, down, left or right, while walking or running Note that the user can perform a game operation through any of various operations performed using the ring-shaped extension apparatus 5. For example, the user can perform an operation of deforming the ring-shaped extension apparatus 5 held by both hands. Through this action, the user can perform, as a game operation, a fitness exercise operation of training the arms.

Where the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that where the right controller 4 is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. Where the left controller 3 is attached to the belt-shaped extension apparatus 6, the communication from the left controller 3 to the main body apparatus 2 is done by wireless communication. Note that the communication control section 101 is an example of the first transmitter.

Figure 13:
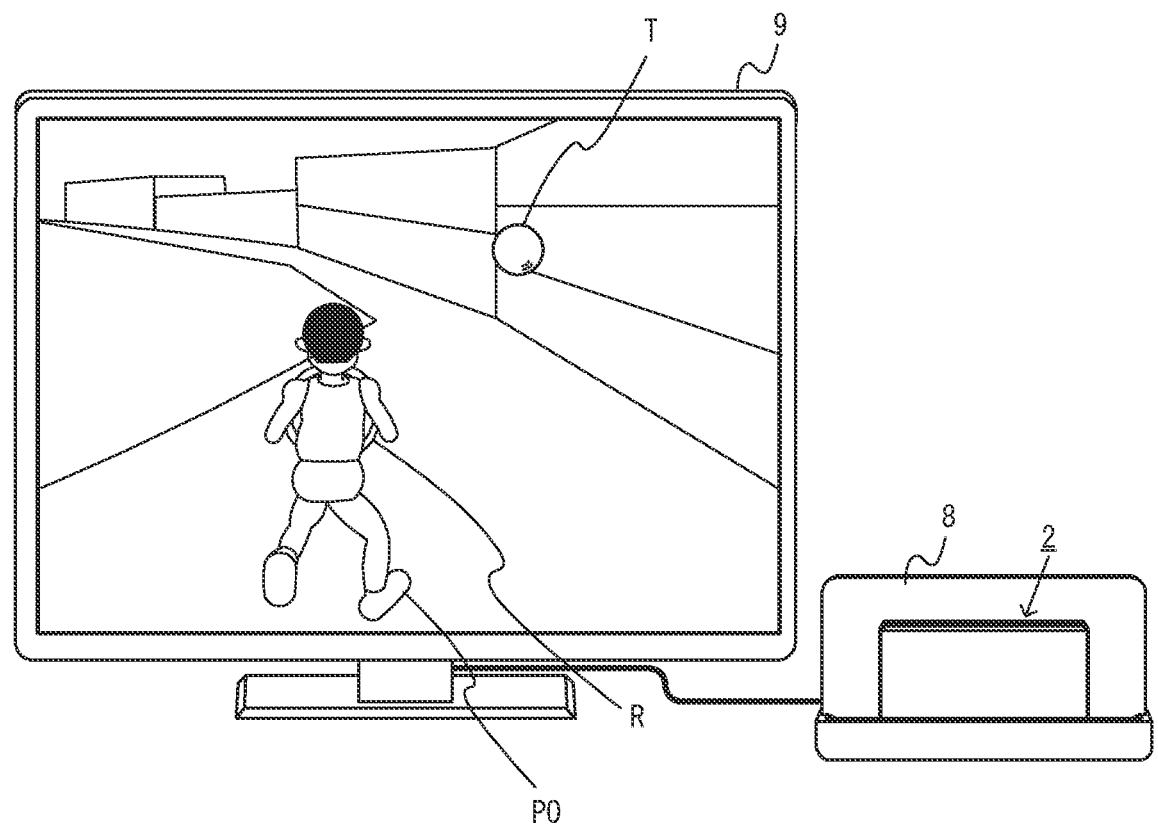
FIG. 13 is a diagram showing a non-limiting example of a game image displayed on a non-portable monitor 9 in accordance with a step-in-place operation by the user.
Figure 14:
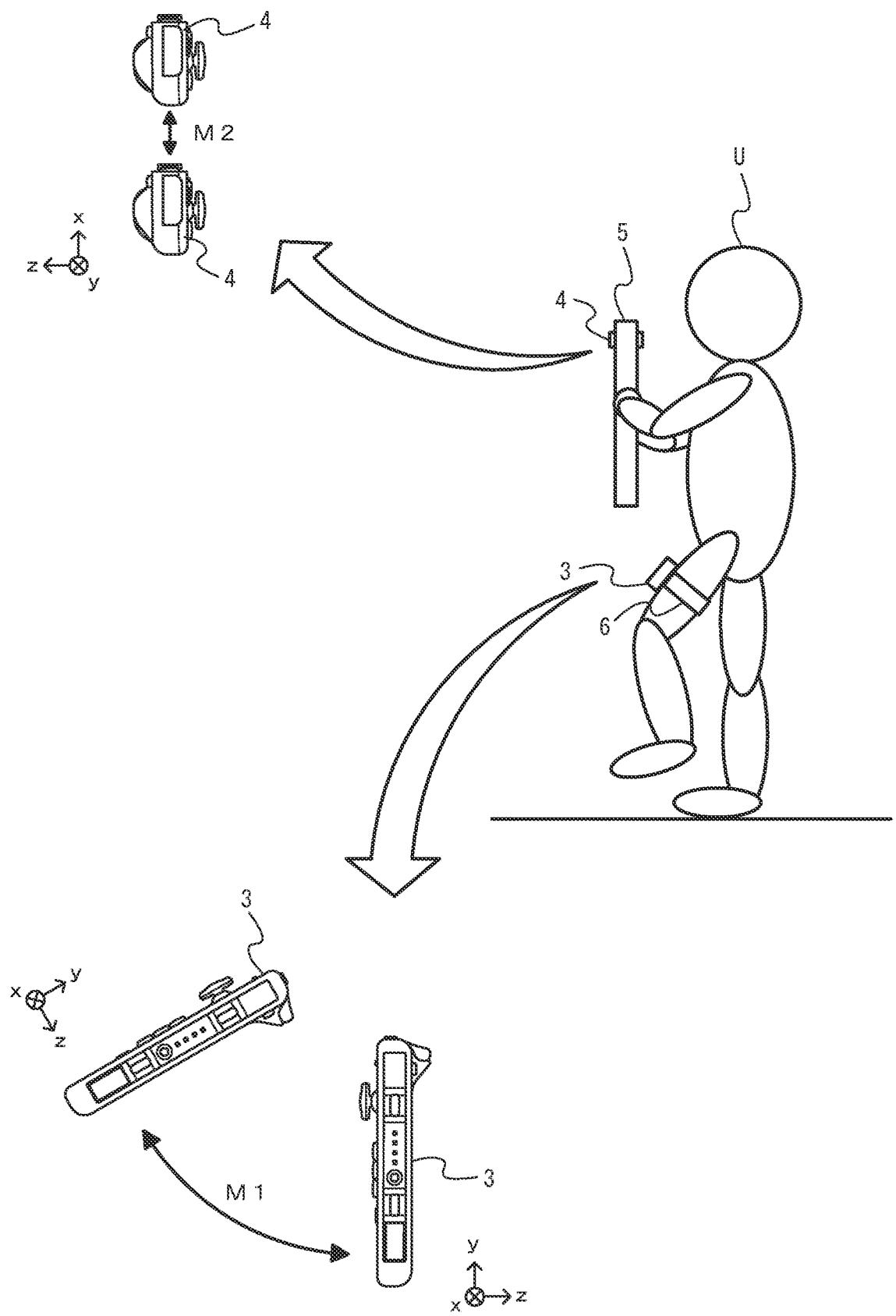
FIG. 14 is a diagram showing a non-limiting example of the action of the left controller 3 and the action of the right controller 4 in accordance with a step-in-place operation by the user.
Figure 15:
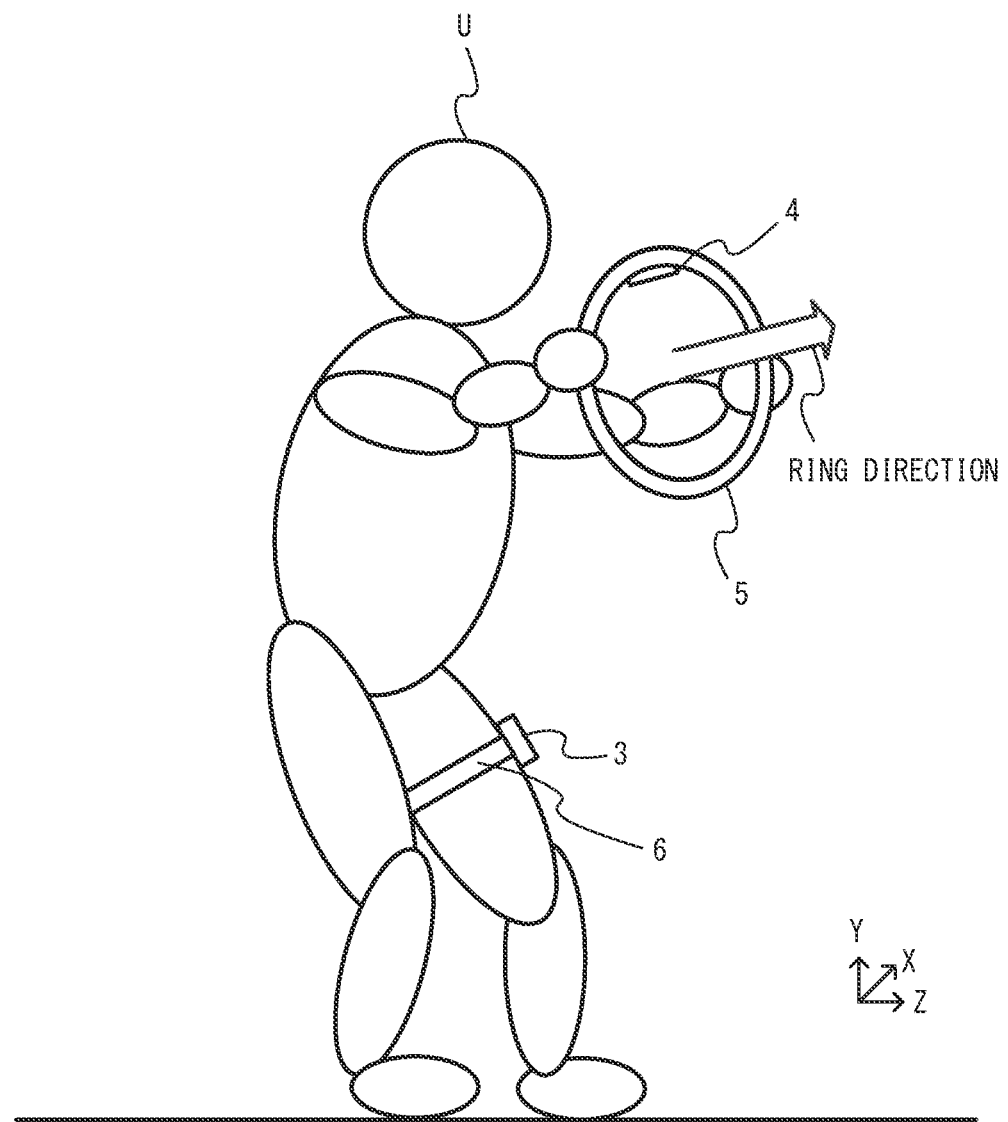
FIG. 15 is a diagram showing a non-limiting example of how the user performs an operation based on the orientation of the ring-shaped extension apparatus 5 (the ring direction)
Figure 16:
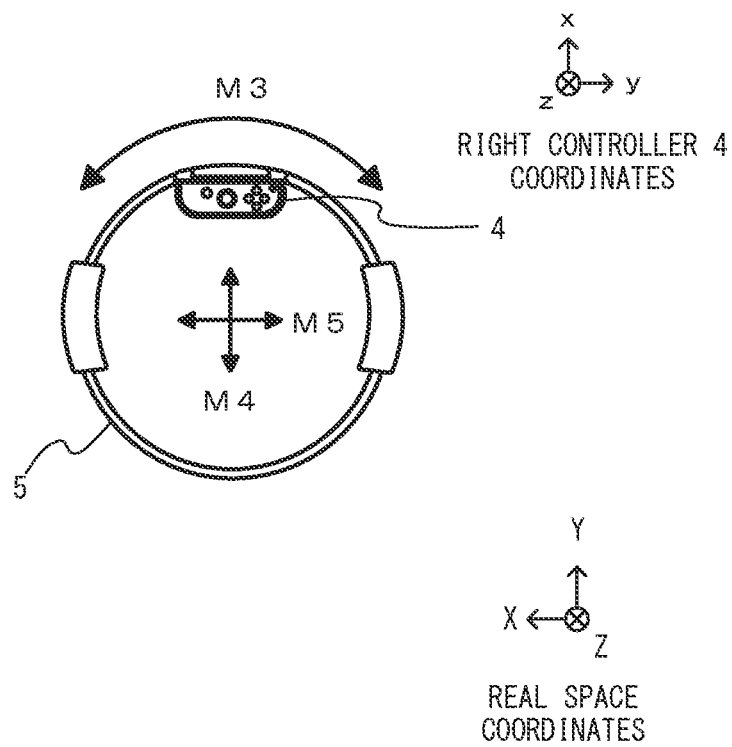
FIG. 16 is a diagram showing a non-limiting example of an action of the ring-shaped extension apparatus 5 when an operation is performed based on the orientation of the ring-shaped extension apparatus 5.

Next, before describing specific processes performed by the main body apparatus 2, the outline of a game to be played on the main body apparatus 2 will be described using FIG. 13 to FIG. 16. Note that FIG. 13 is a diagram showing an example of a game image displayed on a non-portable monitor 9 in accordance with a step-in-place operation by the user. FIG. 14 is a diagram showing an example of the action of the left controller 3 and the action of the right controller 4 in accordance with a step-in-place operation by the user. FIG. 15 is a diagram showing an example of how the user performs an operation based on the orientation of the ring-shaped extension apparatus 5 (the ring direction). FIG. 16 is a diagram showing an example of an action of the ring-shaped extension apparatus 5 when an operation is performed based on the orientation of the ring-shaped extension apparatus 5.

As described above, with the game system 1 of the present embodiment, the left controller 3 and the right controller 4 are attachable/detachable to/from the main body apparatus 2. When the main body apparatus 2 alone is attached to a cradle 8, as shown in FIG. 13, it is possible to output an image (and a sound) to the non-portable monitor 9. The game system will now be described as used with the left controller 3 and the right controller 4 removed from the main body apparatus 2 and with the main body apparatus 2 alone attached to the cradle 8, wherein an image (and a sound) is output from the non-portable monitor 9 connected to the cradle 8. An example will be described where the user performs a game operation using both the right controller 4 attached to the ring-shaped extension apparatus 5 and the left controller 3 attached to the belt-shaped extension apparatus 6. As an example game process, a process in which the virtual object PO displayed on the non-portable monitor 9 moves around in the virtual game space in accordance with a step-in-place operation by the user will be described.

For example, FIG. 13 shows the virtual object PO moving around in the virtual game space by stopping, walking, jogging or running in the virtual game space, and attacking toward a predetermined target object. Then, the user steps in place as if the user were walking, jogging or running while the belt-shaped extension apparatus 6 with the left controller 3 attached thereto is fastened to the user and the ring-shaped extension apparatus 5 with the right controller 4 attached thereto is held by the user. In such a case, the virtual object PO moves around in the virtual game space with the action and the speed in accordance with the step-in-place action by the user. The virtual object PO is holding one ring object R by both hands, and the direction of the ring object R in the virtual game space changes in accordance with the change in the direction of the ring-shaped extension apparatus 5 (the ring direction) in the real space.

Specifically, as shown in FIG. 14, the user performs the user operation of stepping in place while the belt-shaped extension apparatus 6 is fastened to the left thigh and the ring-shaped extension apparatus 5 is held by both hands. Then, as the user steps in place as if the user were walking, jogging, running, etc., or stops stepping in place, an operation input in accordance with the step-in-place operation is given to the main body apparatus 2.

For example, as the user steps in place, the left controller 3 attached to the belt-shaped extension apparatus 6 fastened to the front portion of the left thigh of the user is moved to swing about an axis extending in the left-right horizontal direction of the user, which is perpendicular to the gravity direction (vertical direction) in the real space, between the upright position (where the longitudinal direction of the left controller 3 coincides with the vertical direction) and the elevated position (where the longitudinal direction of the left controller 3 has moved from the upright position toward the front-rear horizontal direction of the user) (this is a swing in the M1 direction shown in the figure, and may hereinafter be referred to as the "front-rear swing"). As an example, where the left controller 3 is attached to the belt-shaped extension apparatus 6 so that the y-axis negative direction of the left controller 3 coincides with the vertical direction in the real space (i.e., so that the y-axis positive direction of the left controller 3 coincides with the vertically upward direction in the real space) while the user is standing still with the left foot being on the floor, the left controller 3 itself is moved to swing in the front-rear direction about an axis extending in the left-right horizontal direction of the user (the x-axis direction of the left controller 3) between the upright position where the y-axis negative direction of the left controller 3 coincides with the vertical direction and the elevated position where the y-axis negative direction of the left controller 3 has moved from the upright position toward the horizontal direction as the user steps in place.

For example, as the user steps in place, the right controller 4 attached to the ring-shaped extension apparatus 5 held by user by both hands is moved to swing in the gravity direction in the real space (this is a swing in the M2 direction shown in the figure, and may hereinafter be referred to as the "vertical swing"). As an example, when the user steps in place while holding the ring-shaped extension apparatus 5 so that the x-axis negative direction of the right controller 4 coincides with the vertical direction in the real space (i.e., so that the x-axis positive direction of the right controller 4 coincides with the vertically upward direction in the real space), the right controller 4 itself swings in the vertical direction so as to reciprocate between the x-axis positive direction of the right controller 4 and the x-axis negative direction of the right controller 4 as the user steps in place.

A method (start-of-movement detection process) for detecting the state in which the user has started moving from the stationary state (i.e., has started a step-in-place operation) by using the left controller 3 attached to the belt-shaped extension apparatus 6 and the right controller 4 attached to the ring-shaped extension apparatus 5 as described above will be described. As an example, when the first start-of-movement condition and the second start-of-movement condition to be described later are both satisfied, or when the first start-of-movement condition and the third start-of-movement condition to be described later are both satisfied, it is determined that the user has started moving by "walking" or "jogging". In such an example, even if one of a set of the first start-of-movement condition and the second start-of-movement condition and another set of the first start-of-movement condition and the third start-of-movement condition is not satisfied, it is possible to determine that the user has started moving from the stationary state if the other set is satisfied, and it is therefore possible to make the determination in accordance with the intention of the user. Note that the "frame" to be described below is the cycle used in processes executed on the game system 1, and one frame=1/60 sec, for example.

(First start-of-movement condition): The total sum of amounts of change in acceleration of the right controller 4 for a predetermined period of time (e.g., 5 frames) is greater than a first threshold (e.g., 1.5 G).

(Second start-of-movement condition): The acceleration in the vertically upward direction in the real space, excluding the gravity acceleration, is greater than or equal to a second threshold (e.g., 0.2 G) for both of the left controller 3 and the right controller 4, i.e., the controllers are accelerating in the vertically upward direction in the real space.

(Third start-of-movement condition): The value of the acceleration in the vertically upward direction in the real space, excluding the gravity acceleration, of the left controller 3 is greater than or equal to a third threshold (third threshold<second threshold, e.g., 0.1 G), and the angular change of the front-rear swing of the left controller 3 for a predetermined period of time is greater than or equal to a fourth threshold (e.g., 15°). Thus, with the start-of-movement determination described above, it is possible to quickly detect the user starting to move from the stationary state. Note that the detection can be even quicker by setting a threshold that is closer to the value recorded while in the stationary state and relatively shortening the amount of time required for the determination. Note that the vertically upward direction (vertical direction) in the real space can be calculated based on the direction of the gravity acceleration on the left controller 3 and the right controller 4 while the left controller 3 and the right controller 4 are in the stationary state. In the state where the user has started moving, it is possible to calculate the attitude change of the left controller 3 and the right controller 4 based on the angular velocity of the left controller 3 and the right controller 4 even while the left controller 3 and the right controller 4 are changing their attitudes or moving. Therefore, in the state where the user has started moving, the vertically upward direction (the vertical direction) in the real space can be calculated by using the directions of the respective gravity accelerations of the left controller 3 and the right controller 4, which are calculated based on the attitude change using the angular velocity. Note that the determination that the user has started moving from the stationary state may be made based only on the set of the first start-of-movement condition and the second start-of-movement condition or based only on the set of the first start-of-movement condition and the third start-of-movement condition.

Next, a method for determining whether the user has started moving by "walking" or by "jogging" when it is determined in the start-of-movement detection process that the user has started moving will be described. As an example, when the at-start-of-movement action determination condition to be described below is satisfied, it is determined that the user has started moving by "walking".

(At-start-of-movement action determination condition): The amount of change in acceleration in the vertically upward direction of the right controller 4 for a predetermined period of time which is a period immediately before the point in time when the start of movement is detected (a period that is longer than the predetermined period of time used for the determination of the first start-of-movement condition, e.g., 15 frames; i.e., a period from a point in time that is 10 frames, for example, after the start of the predetermined period of time until a point in time when the start of movement is detected) is less than or equal to a fifth threshold (e.g., 1.2 G).

Thus, the start-of-movement determination described above includes the process of determining only the "start of movement", performed separately from the process of determining the type of action ("walking" or "jogging"), rather than determining the type of action ("walking" or "jogging") together with determining the "start of movement" (i.e., determining that the user has started moving by "waking" or that the user has started moving by "jogging"). Thus, it is possible to more accurately determine the start of movement, and it is possible to more quickly determine the start of movement. For example, when quicker movements are determined to be jogging and slower movements to be walking, without separately providing the start-of-movement determination, the process may possibly erroneously determine that the user has started moving by "walking" when there is an output associated with slower movements even if the user intends to be stationary. In this regard, by first determining the start of movement and then determining the type of movement, it is possible to avoid erroneously determining the start of movement in contradiction with the intention of the user. Moreover, by starting to extract data used for the determination of the type of movement in a period before the determination of the start of movement, rather than after the determination of the start of movement, it is possible to quickly determine the type of movement. As will be clear from the description below, regarding the determination of the action type after the "start of movement", it is possible to improve the accuracy of the series of action determination processes by separately providing, as "the action determination after the start of movement", another determination method using a relatively long data obtaining period.

Next, a method for determining whether the user is moving by "walking" or moving by "jogging" while the user continues to move after it is determined that the user has started moving by "walking" or "jogging" will be described. As an example, it is determined that the user is "walking" if the first post-start-of-movement action determination condition, the second post-start-of-movement action determination condition and the third post-start-of-movement action determination condition to be described below are all satisfied. When at least one of the first post-start-of-movement action determination condition, the second post-start-of-movement action determination condition and the third post-start-of-movement action determination condition to be described below is not satisfied, it is determined that the user is "jogging".

(First post-start-of-movement action determination condition): The cycle with which the user steps in place (specifically, the cycle with which the left thigh of the user, to which the belt-shaped extension apparatus 6 is fastened, is raised and lowered) is greater than or equal to an eighth threshold (e.g., 60 frames).

(Second post-start-of-movement action determination condition): The amount of time from when one thigh of the user (specifically, the left thigh of the user, to which the belt-shaped extension apparatus 6 is fastened) is raised to the highest position until it is lowered to the lowest position is greater than or equal to a ninth threshold (e.g., 20 frames).

(Third post-start-of-movement action determination condition): The amount of change in acceleration in the vertically upward direction of the right controller 4 for a predetermined period of time which is a period immediately before the point in time when the start of movement is detected (a period that is longer than the predetermined period of time used for the determination of the first start-of-movement condition, e.g., 15 frames; i.e., a period from a point in time that is 10 frames, for example, after the start of the predetermined period of time until a point in time when the start of movement is detected) is less than or equal to the fifth threshold (e.g., 1.2 G). Thus, the method for determining the action type (e.g., "walking" or "jogging") of the user after it is determined that the user has started moving is different from the method for determining the action type when the user starts moving from the stationary state. Specifically, the period of time (the eighth threshold and the ninth threshold) for obtaining data for determining the action type of the user after it is determined that the user has started moving is longer than the period of time for obtaining data for determining the action type of the user when the user starts moving from the stationary state.

Note that although the embodiment described above is directed to an example where it is determined that the user is "walking" when the first post-start-of-movement action determination condition, the second post-start-of-movement action determination condition and the third post-start-of-movement action determination condition are all satisfied, it may be determined that the user is "walking" under another condition. For example, it may be determined that the user is "walking" when at least one of the first post-start-of-movement action determination condition and the second post-start-of-movement action determination condition is satisfied, while determining that the user is "jogging" when neither of the first post-start-of-movement action determination condition and the second post-start-of-movement action determination condition is satisfied.

As described above, the virtual object PO moving around in the virtual game space with the action and the speed in accordance with the step-in-place action by the user is displayed on the display screen (e.g., the non-portable monitor 9). For example, the virtual object PO is displayed to be "stationary" in the virtual game space when it is determined that the user is "stationary" in the real space; the virtual object PO is displayed to be moving by walking in the virtual game space when it is determined that the user is stepping in place as if to "walk" in the real space; and the virtual object PO is displayed to be moving by jogging in the virtual game space when it is determined that the user is stepping in place as if to "jog" in the real space. However, when the virtual object PO transitions to a different action in response to a change in the step-in-place action by the user, a predetermined action may be interposed before transitioning to the next action. As an example, when the step-in-place action by the user changes from "jogging" to "walking", the action of the virtual object PO may once transition from "jogging" to "stationary" before transitioning to "walking". For example, in a game where the virtual object PO appears and where the action of stopping in the virtual game space is an important element, it is possible to prevent the virtual object PO from "walking" without "stopping" for a short period of time even though the user has stopped the step-in-place action of "jogging" and come to a stop, and it is possible to improve the responsiveness for the operation of stopping the virtual object PO.

In order to calculate the step-in-place cycle of the user (e.g., the cycle with which the left thigh of the user to which the belt-shaped extension apparatus 6 is fastened is raised and lowered), it is necessary to detect the action of the user raising and lowering the thigh (e.g., the left thigh). While the thigh-raised/lowered determination for detecting the user's action of raising and lowering the thighs may use any method using at least one of the angular velocity and the acceleration of the left controller 3, an example method may make the determination by using both of the angular velocity and the acceleration of the left controller 3. Specifically, it may be determined to be the thigh-raised state when the first thigh-raised determination condition and the second thigh-raised determination condition to be described below are both satisfied.

(First thigh-raised determination condition): When the maximum value and the minimum value of the angle of the left controller 3 about the x-axis direction (this angle increases as the angle of knee bend increases) for an immediately preceding predetermined period of time (e.g., 15 frames) are obtained, the maximum value is obtained at a later point in time than the minimum value.

(Second thigh-raised determination condition): The acceleration of the left controller 3 in the vertical direction for an immediately preceding predetermined period of time (e.g., 15 frames) is less than or equal to a sixth threshold (e.g., 0.8 G), i.e., the left controller 3 is accelerating in the vertically upward direction in the real space. It may be determined to be the thigh-lowered state when the first thigh-lowered determination condition and the second thigh-lowered determination condition to be described below are both satisfied.

(First thigh-lowered determination condition): When the maximum value and the minimum value of the angle of the left controller 3 about the x-axis direction for an immediately preceding predetermined period of time (e.g., 15 frames) are obtained, the minimum value is obtained at a later point in time than the maximum value.

(Second thigh-lowered determination condition): The acceleration of the left controller 3 in the vertical direction for an immediately preceding predetermined period of time (e.g., 15 frames) is greater than or equal to a seventh threshold (e.g., 1.2 G), i.e., the left controller 3 is accelerating in the vertical direction in the real space.

As the type of the step-in-place action by the user, a step-in-place action of "running", for which the step-in-place cycle is shorter than "jogging", may be identified, as well as "walking" and "jogging". As an example, the amount of change in the acceleration of the left controller 3 for an immediately preceding predetermined amount of time (e.g., 60 frames) may be summed so as to determine the step-in-place action of "jogging" and the step-in-place action of "running" through comparison between the average value for a predetermined number of processes in which the total sum is calculated (e.g., 30 frames) and the threshold set for each user (user threshold). Specifically, it is determined that the user is stepping in place by "running" when the average value is greater than or equal to the user threshold, and it is determined that the user is stepping in place by "jogging" when the average value is less than the user threshold (where the determination condition for "jogging" is satisfied). Herein, the user is prompted to perform a step-in-place action of "jogging" and a step-in-place action of "running" before the start of the game, and the user threshold is set for each user before the start of the game based on the average value of the amount of change in acceleration obtained from the step-in-place actions.

Note that the user threshold of each user may be set at any timing and may be set in accordance with the various special effects as long as it is before the user threshold is actually used. As the first example, before the start of the game in which the user threshold is used, the user may be clearly instructed to perform a step-in-place action of "jogging" and to perform a step-in-place action of "running" so as to set the user threshold of the user based on the results of the step-in-place actions performed in response to the instruction. As the second example, there may be a scene where the user is requested to perform a step-in-place action of "jogging" and a scene where the user is requested to perform a step-in-place action of "running" during the game in which the user threshold is used (preferably, in a beginning part of the game), and the user threshold of the user may be set based on the results of the step-in-place actions performed in these scenes.

While the above description is directed to an example where the user threshold set for each user is used to determine the step-in-place action of "jogging" and the step-in-place action of "running", the user threshold may be used for other determinations. As an example, it is clear that the user threshold set for each user can be used to distinguish between "walking" and "jogging", which are distinguished from each other similarly based on the step-in-place speed. By prompting the user in advance before the start of the game to perform the step-in-place action of "walking" and the step-in-place action of "jogging", it is possible to set user thresholds for different circumstances. In such a case, the user thresholds can be used to determine the step-in-place action of "walking" and the step-in-place action of "jogging".

Note that where two user thresholds are set, i.e., a user threshold for distinguishing between the step-in-place action of "jogging" and the step-in-place action of "running", and another user threshold for distinguishing between the step-in-place action of "walking" and the step-in-place action of "jogging", the two user thresholds may be used to evaluate the moving speed of the virtual object PO for the step-in-place action between these user thresholds. For example, where it is determined that the user is performing the step-in-place action of "jogging", the moving speed of the virtual object PO may be set through linear interpolation so that the moving speed is closer to a moving speed of the virtual object PO for the step-in-place action of "running" as the step-in-place action is performed at a speed (cycle) that is closer to the user threshold for distinguishing between the step-in-place action of "jogging" and the step-in-place action of "running" That is, one of the two user thresholds that is used for distinguishing between the step-in-place action of "jogging" and the step-in-place action of "running"

may be used for distinguishing between step-in-place actions, and the relationship between the two user thresholds may be used for linear interpolation of the moving speed between the thresholds.

The user threshold may change as the game proceeds. As an example, the user threshold may change in steps in accordance with the progress of the game (e.g., the distance traveled in the virtual game space, the number and the contents of game stages cleared).

While the step-in-place action of "running" is distinguished, as well as "walking" and "jogging", as the type of the step-in-place action by the user in the embodiment described above, the step-in-place action of "running" does not need to be distinguished. In such a case, as the speed of the action by the user (e.g., the step-in-place cycle or the step-in-place speed) increases during the step-in-place action of "jogging", the speed of "jogging" (specifically, the speed at which the virtual object PO, which moves around in the virtual game space, with the action and the speed in accordance with the step-in-place action by the user, moves by "jogging") may be increased.

Thus, the determination of whether the user is stepping in place by "walking" or stepping in place by "jogging" is made based on the first post-start-of-movement action determination condition and the second post-start-of-movement action determination condition, i.e., based on the angular velocity detected by a gyro sensor. In contrast, the acceleration detected by an acceleration sensor is used when determining a change from a state where the user is stepping in place by "jogging" to a state where the user is stepping in place by "running" with a shorter step-in-place cycle. Therefore, the step-in-place action of "walking" and the step-in-place action of "jogging" are distinguished from each other based on the angular velocity, and when the acceleration is large during the step-in-place action of "jogging", it is determined that the step-in-place cycle has become shorter. This is because appropriate parameters are selected depending on the cycle of the step-in-place action by the user, and it is an effective method when, for example, it is difficult to distinguish, based on the acceleration, between the step-in-place action of "walking" and the step-in-place action of "jogging".

The determination of whether the user is "walking", "jogging" or "running" after it is determined that the user has started moving by "walking" or "jogging" is made by using only the output from a motion sensor (e.g., an acceleration sensor or an angular velocity sensor) of the left controller 3 attached to the belt-shaped extension apparatus 6. Herein, in the present embodiment, since the moving speed of the virtual object PO moving around in the virtual game space changes depending on whether the user is "walking", "jogging" or "running", the moving speed of the virtual object PO is controlled based only on the output from a motion sensor of the left controller 3 while the virtual object PO is moving. Note that in other embodiments, the moving speed may be controlled while the virtual object PO is moving not only by using the output from a motion sensor of the left controller 3 but also by using the output from a motion sensor (e.g., an acceleration sensor or an angular velocity sensor) of the right controller 4 attached to the ring-shaped extension apparatus 5. As an example, in a scene such that the direction of the virtual object PO cannot be changed in the virtual game space, one may consider controlling the moving speed of the virtual object PO by using the output from the motion sensor of the right controller 4 attached to the ring-shaped extension apparatus 5.

Next, a method for determining that the user has stopped the step-in-place action of "walking" and come to a stop. As an example, it is determined that the user has stopped the step-in-place action of "walking" and come to a stop when at least one of the first stop action determination condition and the second stop action determination condition to be described below is satisfied.

(First stop action determination condition): The angular velocity of the right controller 4 is 0.

(Second stop action determination condition): The angular change of the left controller 3 for an immediately preceding predetermined period of time (e.g., 90 frames) is less than or equal to a tenth threshold (e.g., 10°) and the amount of change in the angular velocity of the left controller 3 for an immediately preceding predetermined period of time (e.g., 10 frames) is less than or equal to an eleventh threshold (e.g., 0.01).

Herein, in order for the user to maintain the state where it is determined that the user is performing the step-in-place action of "walking" without being determined to have stopped the step-in-place action, it is necessary to continuously produce an angular velocity of the right controller 4 so that neither of the first stop action determination condition and the second stop action determination condition holds, and to produce an angular change of the left controller 3 that is greater than the tenth threshold or produce a change in the angular velocity of the left controller 3 that is greater than or equal to the eleventh threshold for a predetermined amount of time. Therefore, in order for the user to maintain the state where it is determined that the user is performing the step-in-place action of "walking" without being determined to have stopped the step-in-place action, it is necessary to continuously move both the left controller 3 (the belt-shaped extension apparatus 6) and the right controller 4 (the ring-shaped extension apparatus 5), thus requiring the user not only to move the lower body but also to move the upper body, and promoting operations using the whole body of the user. This means that the first stop action determination condition and the second stop action determination condition serve also as the "walking" continuation determination condition, i.e., the user action continuation determination condition.

As described above, in order for the user to maintain the state where it is determined that the user is performing the step-in-place action of "walking" without being determined to have "stopped" the step-in-place action, it is necessary that both of the left controller 3 (the belt-shaped extension apparatus 6) and the right controller 4 (the ring-shaped extension apparatus 5) be moving continuously. This requires that the amount of change in the output of each motion sensor (e.g., an angular velocity sensor) for a predetermined period of time be a predetermined amount. When the outputs from the motion sensors of the left controller 3 and the right controller 4 indicate that at least one of the controllers has stopped moving, it is determined that the user has "stopped" the step-in-place action.

Next, a method for determining that the user has stopped the step-in-place action of "jogging" or "running" and come to a stop will be described. As an example, when at least one of the third stop action determination condition to the fifth stop action determination condition to be described below is satisfied, it is determined that the user has stopped the step-in-place action of "jogging" or "running" and come to a stop.

(Third stop action determination condition): The angular velocity of the right controller 4 is 0.

(Fourth stop action determination condition): The change in acceleration of the left controller 3 or the right controller 4 for an immediately preceding predetermined period of time (e.g., 10 frames) is less than or equal to a twelfth threshold.

(Fifth stop action determination condition): The average value of the angular velocity of the left controller 3 for an immediately preceding predetermined period of time (e.g., 10 frames) is less than or equal to a thirteenth threshold.

In order for the user to maintain the state where it is determined that the user is performing the step-in-place action of "jogging" or "running" without being determined to have "stopped" the step-in-place action, it is necessary to continuously produce an angular velocity in the right controller 4, to produce an acceleration greater than the twelfth threshold in both of the left controller 3 and the right controller 4 for a predetermined amount of time, and to move the left controller 3 so as to produce an angular velocity average value greater than the thirteenth threshold for a predetermined amount of time so that none of the third stop action determination condition to the fifth stop action determination condition holds. Therefore, in order for the user to maintain the state where it is determined that the user is performing the step-in-place action of "jogging" or "running" without being determined to have "stopped" the step-in-place action, it is necessary to continuously move both of the left controller 3 (the belt-shaped extension apparatus 6) and the right controller 4 (the ring-shaped extension apparatus 5), thus requiring the user not only to move the lower both but also to move the upper body, and promoting operations using the whole body of the user. This means that the third stop action determination condition to the fifth stop action determination condition serve also as the "jogging" or "running" continuation determination condition, i.e., the user action continuation determination condition.

As described above, in order for the user to maintain the state where it is determined that the user is performing the step-in-place action of "jogging" or "running" without being determined to have "stopped" the step-in-place action, it is necessary that both of the left controller 3 (the belt-shaped extension apparatus 6) and the right controller 4 (the ring-shaped extension apparatus 5) be moving continuously. This requires that the amount of change in the output of each motion sensor (e.g., an acceleration sensor or an angular velocity sensor) for a predetermined period of time be a predetermined amount. When the outputs from the motion sensors of the left controller 3 and the right controller 4 indicate that at least one of the controllers has stopped moving, it is determined that the user has "stopped" the step-in-place action.

The user action continuation determination condition under which it is determined that the user is performing the step-in-place action of "walking", "jogging" or "running" without the user being determined to have "stopped" after "start of movement" is detected by determining that the user has started the step-in-place action from the stationary state is different from the start-of-movement condition under which it is determined that the user has started moving (i.e., has started the step-in-place action) from the stationary state. Thus, different determination conditions suitable for the step-in-place state of the user are set. For example, the start-of-movement condition under which it is determined that the user has started moving from the stationary state uses the change in attitude of the left controller 3 calculated by using the angular velocity of the left controller 3 since the detected angular velocity of the left controller 3 has a relatively high reliability after the user has started moving. In contrast, for the user action continuation determination condition under which it is determined that the user is performing the step-in-place action of "walking", "jogging" or "running" without the user being determined to have "stopped" after the user started the step-in-place action from stationary state, the angular velocity of the left controller 3 itself is not used for the determination but the determination is made without using the angular velocity or the determination is made by using the difference of the angular velocity. Note that where the user action continuation determination condition under which it is determined that the user is performing the step-in-place action of "walking", "jogging" or "running" without the user being determined to have "stopped" after the user started the step-in-place action from stationary state is satisfied, the virtual object PO in the virtual game space also continues to move in accordance with the step-in-place action by the user in response to the determination and the virtual object PO continues to move while the action continuation determination condition is satisfied. This is an example of the first action.

Note that as described above, the virtual object PO moving around in the virtual game space with the action and the speed in accordance with in accordance with the step-in-place action by the user is displayed on the display screen (e.g., the non-portable monitor 9). For example, the action of the virtual object PO may be controlled and the moving speed may be changed so that the motion of the user and the motion of the virtual object PO coincide with each other based on the results of the determination of the step-in-place action by the user and the thigh-raised/lowered determination. Specifically, the awkwardness (discrepancy) to be felt during user operations can be reduced by controlling the walking or running action of the virtual object PO so that the left leg of the virtual object PO is raised in sync with the left leg of the user being raised and the right leg of the virtual object PO is raised in sync with the right leg of the user being raised in accordance with the result of the thigh-raised/lowered determination.

While the description above is directed to an example where the walking or running action of the virtual object PO is controlled so that the left leg/right leg of the virtual object PO is raised in sync with the left leg/right leg of the user being raised, another action of the virtual object PO may be synchronized with the step-in-place action by the user. As an example, the action of the virtual object PO (e.g., a swimming action or an action of rotating a rotating object by both hands) may be controlled so that the right hand/left hand of the virtual object PO moves in sync with the user raising the left leg/right leg.

Thus, the moving speed at which the virtual object PO moves around in the virtual game space after it is determined that the user has started moving is controlled based only on the output from a motion sensor (e.g., an acceleration sensor or an angular velocity sensor) of the left controller 3 attached to the belt-shaped extension apparatus 6. Note that in other embodiments, the moving speed may be controlled while the virtual object PO is moving not only by using the output from a motion sensor of the left controller 3 but also by using the output from a motion sensor (e.g., an acceleration sensor or an angular velocity sensor) of the right controller 4 attached to the ring-shaped extension apparatus 5.

In the present embodiment, as shown in FIG. 15, the user performs an operation of changing the direction of the ring-shaped extension apparatus 5 up, down, left and right in the real space while holding the ring-shaped extension apparatus 5 by both hands, with the belt-shaped extension apparatus 6 fastened to the left thigh. Then, as the user changes the direction of the ring-shaped extension apparatus 5 while the user is stationary or stepping in place in the real space, an operation input in accordance with the direction is given to the main body apparatus 2.

For example, as shown in FIG. 15, in the present embodiment, the direction away from the user holding the ring-shaped extension apparatus 5 by both hands along the ring axis of the ring-shaped portion 201 of the ring-shaped extension apparatus 5 is defined as the ring direction of the ring-shaped extension apparatus 5. Then, as the user changes the ring direction of the ring-shaped extension apparatus 5 that the user holds by both hands while the user is stationary or stepping in place in the real space, the direction of the ring object R held by the virtual object PO in the virtual game space also changes. Then, as the user performs a predetermined operation using the ring-shaped extension apparatus 5 (e.g., an operation of deforming the ring-shaped portion 201 from the normal state so that the grip covers 203 and 204 of the ring-shaped extension apparatus 5 come closer to each other), it is possible to attack (e.g., destroy) an object T (see FIG. 13) that is arranged in the ring direction of the ring object R held by the virtual object PO (the direction away from the virtual object PO along the ring axis of the ring object R), for example.

As shown in FIG. 16, an operation based on the attitude (orientation) of the ring-shaped extension apparatus 5 may be an operation of rotating the ring-shaped portion 201 of the ring-shaped extension apparatus 5 whose grip covers 203 and 204 are held by both hands about the ring axis of the ring-shaped portion 201 (the roll operation of rotating in the M3 direction shown in the figure), an operation of changing the ring direction of the ring-shaped extension apparatus 5 to an elevated angle (upward direction) or to a depressed angle (downward direction) (the pitch operation indicated by the M4 direction shown in the figure), and an operation of changing the ring direction of the ring-shaped extension apparatus 5 left and right (the yaw operation indicated by the M5 direction shown in the figure). Herein, since the direction of the gravity acceleration, which acts upon the ring-shaped extension apparatus 5, changes in the roll operation and the pitch operation, the direction of the gravity acceleration acting upon the right controller 4 can be detected through calculation by using the acceleration and/or the angular velocity acting upon the right controller 4 attached to the ring-shaped extension apparatus 5. In the yaw operation, since the direction of the gravity acceleration acting upon the ring-shaped extension apparatus 5 does not change, the attitude change of the right controller 4 from the initial state can be detected through calculation by using the angular velocity acting upon the right controller 4 attached to the ring-shaped extension apparatus 5. Note that it is common in reality that an operation as a mixture of a roll operation, a pitch operation and a yaw operation is performed, and the final ring direction is calculated as a composition of ring directions that change respectively in the roll operation, in the pitch operation and in the yaw operation.

For example, consider an operation of changing the ring direction of the ring-shaped extension apparatus 5 from the initial state where the user is holding the ring-shaped extension apparatus 5 so that the y-axis direction the right controller 4 attached to the ring-shaped extension apparatus 5 is the horizontal direction in the real space (the X-axis direction shown in the figure) and the x-axis positive direction thereof is the vertically upward direction in the real space (the Y-axis positive direction shown in the figure), as shown in FIG. 16. In the initial state, since the gravity acceleration acts in the vertical direction upon the right controller 4 attached to the ring-shaped extension apparatus 5, the acceleration of the right controller 4 in the x-axis negative direction is 1 G, and the acceleration in the y-axis direction (the left-right direction) and the z-axis direction (the front-rear direction) is 0. When the ring-shaped extension apparatus 5 is moved in a pitch operation from this initial state, the angle of pitch operation can be calculated based on the acceleration acting in the z-axis direction. When the ring-shaped extension apparatus 5 is moved in a roll operation from this initial state, the angle of roll operation can be calculated based on the acceleration acting in the y-axis direction. Therefore, it is possible to calculate the angle of pitch operation and the angle of roll operation performed on the ring-shaped extension apparatus 5 by detecting accelerations acting in the z-axis direction (the front-rear direction) and the y-axis direction (the left-right direction).

Herein, when an operation of quickly moving the ring-shaped extension apparatus 5 or an operation of stepping in place while holding the ring-shaped extension apparatus 5 is performed, such an operation may add acceleration or errors may accumulate. In such a case, the attitude of the ring-shaped extension apparatus 5 (the right controller 4) may be calculated by using the angle calculated from the acceleration and the angle calculated from the angular velocity. As an example, the attitude of the ring-shaped extension apparatus 5 (the right controller 4) may be calculated by adding the amount of angle change, which is calculated based on the angular velocity obtained for the second data obtaining period (<the first data obtaining period, e.g., 15 frames), to the angle calculated based on the average value of the acceleration obtained for the first data obtaining period (e.g., 30 frames). Thus, it is possible to cancel out instantaneous shakes, errors, etc., by calculating the attitude of the ring-shaped extension apparatus 5 (the right controller 4) by using different parameters, and it is possible to improve the detection responsiveness by using the angular velocity that is calculated for a relatively short data obtaining period.

When the ring-shaped extension apparatus 5 is moved in a yaw operation from the initial state, the direction of the gravity acceleration acting upon the ring-shaped extension apparatus 5 does not change, the angle of yaw operation can be calculated by using the angular velocity about the vertical direction, i.e., by using the angular velocity about the x-axis direction of the right controller 4 (the up-down direction).

As the user performs a predetermined operation using the ring-shaped extension apparatus 5 after directing the ring direction of the ring-shaped extension apparatus 5 toward a desired direction, it is possible to give a predetermined change in the virtual game space in accordance with the ring direction. For example, the predetermined operation is an operation of deforming the ring-shaped portion 201 so that the grip covers 203 and 204 of the ring-shaped extension apparatus 5 move closer to each other from the normal state by a predetermined amount or more, and this operation is detected based on the strain detected by the strain gauge provided on the ring-shaped extension apparatus 5. As an example, when the ring-shaped portion 201 of the ring-shaped extension apparatus 5 is deformed from the normal state, the strain of the base portion is detected by the strain gauge, and it is possible to calculate, based on the detected strain, the direction of deformation of the ring-shaped portion 201 (i.e., whether the two grips 203 and 204 move closer to each other or move away from each other) and the amount of deformation. Then, it is determined that the predetermined operation has been performed when the direction of deformation of the ring-shaped portion 201 is such that the two grips 203 and 204 move closer to each other and when the amount of deformation is greater than or equal to a predetermined threshold.

Thus, the present embodiment enables a different operation of changing the orientation of the ring-shaped extension apparatus 5 being held by the user while an operation of stepping in place is being performed. Specifically, these two operations are both realized by detecting the operation of changing the orientation of the ring-shaped extension apparatus 5 by using the output from a motion sensor (e.g., an acceleration sensor or an angular velocity sensor) of the right controller 4 (the ring-shaped extension apparatus 5) while the condition is satisfied under which the left controller 3 (the belt-shaped extension apparatus 6) and the right controller 4 (the ring-shaped extension apparatus 5) are both moving continuously in order for the user to maintain the state where it is determined that the user is performing the step-in-place action of "walking", "jogging" or "running" without being determined to have "stopped" the step-in-place action as described above. As opposed to the step-in-place operation, which requires the condition under which it is determined that both of the left controller 3 and the right controller 4 be moving continuously, the operation of changing the orientation of the ring-shaped extension apparatus 5 can be determined based only on the output from a motion sensor of the right controller 4 (the ring-shaped extension apparatus 5), and it can be realized by a simpler control as compared with the step-in-place operation. The process of detecting the ring direction of the ring-shaped extension apparatus 5 controlled by the user and changing the direction of the ring object R (i.e., the direction of the virtual object PO) based on the ring direction uses not only the angular velocity detected by the right controller 4 attached to the ring-shaped extension apparatus 5 but also the acceleration. Thus, it is possible to use appropriate parameters in accordance with the state of the operation by the user. Note that the operation of changing the orientation of the ring-shaped extension apparatus 5 may be determined by using the output from a sensor separate from the motion sensor of the left controller 3 or an input device, in addition to the output from the motion sensor of the right controller 4 (the ring-shaped extension apparatus 5).

As described above, the virtual object PO moving in the virtual game space in accordance with the user operation is displayed on the display screen (e.g., the non-portable monitor 9). Herein, the virtual object PO, holding the ring object R, moves around in the virtual game space with the action and the speed in accordance with the thigh raising/thigh lowering operation by the user using the belt-shaped extension apparatus 6, and changes the ring direction of the ring object R in the virtual game space in accordance with the user operation using the ring-shaped extension apparatus 5. That is, the action of the legs of the virtual object PO is controlled based on the operation data of the left controller 3 attached to the belt-shaped extension apparatus 6 fastened to the lower body of the user, and the action of the arms of the virtual object PO is controlled based on the operation data of the right controller 4 attached to the ring-shaped extension apparatus 5 held by the arms of the upper body of the user.

Note that while the description above is directed to an example where processes are performed by using the xyz axes defined in the left controller 3 and the right controller 4 for the sake of specificity, the xyz axes may possibly be arranged in practice in directions in the real space different from those described above, and attitude detections based on different directions may be necessary when the attitude of the belt-shaped extension apparatus 6 and the attitude of the ring-shaped extension apparatus 5 change. For example, when detecting the attitude of the belt-shaped extension apparatus 6 and the attitude of the ring-shaped extension apparatus 5 in practice, the calculation may be done based on three axes orthogonal to each other in the real space, or the calculation may be done based on the left-right direction (the X-axis direction shown in the figure), the up-down direction (the Y-axis direction shown in the figure) and the front-rear direction (the Z-axis direction shown in the figure) in the real space. In such a case, it is possible to similarly detect the attitude of the belt-shaped extension apparatus 6 by substituting the x axis (the left-right direction) of the left controller 3 in the description above with the left-right direction (the X-axis direction shown in the figure) in the real space, the y axis (the up-down direction) of the left controller 3 with the up-down direction (the Y-axis direction shown in the figure) in the real space, and the z axis (the front-rear direction) of the left controller 3 with the front-rear direction (the Z-axis direction shown in the figure) in the real space. It is possible to similarly detect the attitude of the ring-shaped extension apparatus 5 by substituting the y axis (the left-right direction) of the right controller 4 in the description above with the left-right direction (the X-axis direction shown in the figure) in the real space, the x axis (the up-down direction) of the right controller 4 with the up-down direction (the Y-axis direction shown in the figure) in the real space, and the z axis (the front-rear direction) of the right controller 4 with the front-rear direction (the Z-axis direction shown in the figure) in the real space.

The parameters (acceleration, angular velocity, angle, cycle, amount of change, total sum, average value, period, threshold, etc.) and values thereof used in processes in the description above are merely illustrative, and they may be different parameters and different values. There may be a plurality of play modes in which different parameters are more important while playing the game, and one of the play modes may be selected before the start of the game in response to a user operation. For example, there may be a play mode in which the magnitude and the change of acceleration are more important, and a play mode in which the magnitude and the change of angular velocity are more important. As an example, the process example in the embodiment described above may be used as a play mode in which the magnitude and the change of acceleration are more important, wherein at least one of processes using acceleration in the play mode in which the magnitude and the change of acceleration are more important may be changed to a process using the angular velocity or the angle, or all of the processes using the acceleration may be changed to processes using the angular velocity or the angle, thereby setting a play mode in which the magnitude and the change of angular velocity are more important. Specifically, the process of determining the step-in-place action of "jogging" by the user and the step-in-place action of "running" by the user may be performed by using the angular velocity (e.g., the average value for a predetermined number of processes of the total sum of the angular velocity), instead of acceleration. In such a case, the user threshold used for determining the step-in-place action is also set in advance based on the angular velocity. Therefore, the play mode in which the magnitude and the change of acceleration are more important serves as a mode in which the moving speed of the virtual object PO is higher when the output from the acceleration sensor included in the left controller 3 attached to the belt-shaped extension apparatus 6 is larger than when it is smaller. In contrast, the play mode in which the magnitude and the change of angular velocity are more important serves as a mode in which the moving speed of the virtual object PO is higher when the output from the angular velocity sensor included in the left controller 3 attached to the belt-shaped extension apparatus 6 is larger than when it is smaller. Where it is possible to switch between the play mode in which the step-in-place action of "jogging" by the user and the step-in-place action of "running" by the user are distinguished from each other based on acceleration and the play mode in which they are distinguished from each other based on angular velocity, it is possible in the latter play mode to perform operations through a user action (e.g., the operation of bending and stretching the knee instead of the operation of stepping in place) that has a relatively small impact on the floor surface. Thus, the former play mode may be used as the normal play mode, and the latter play mode as the silent mode.

Figure 17:
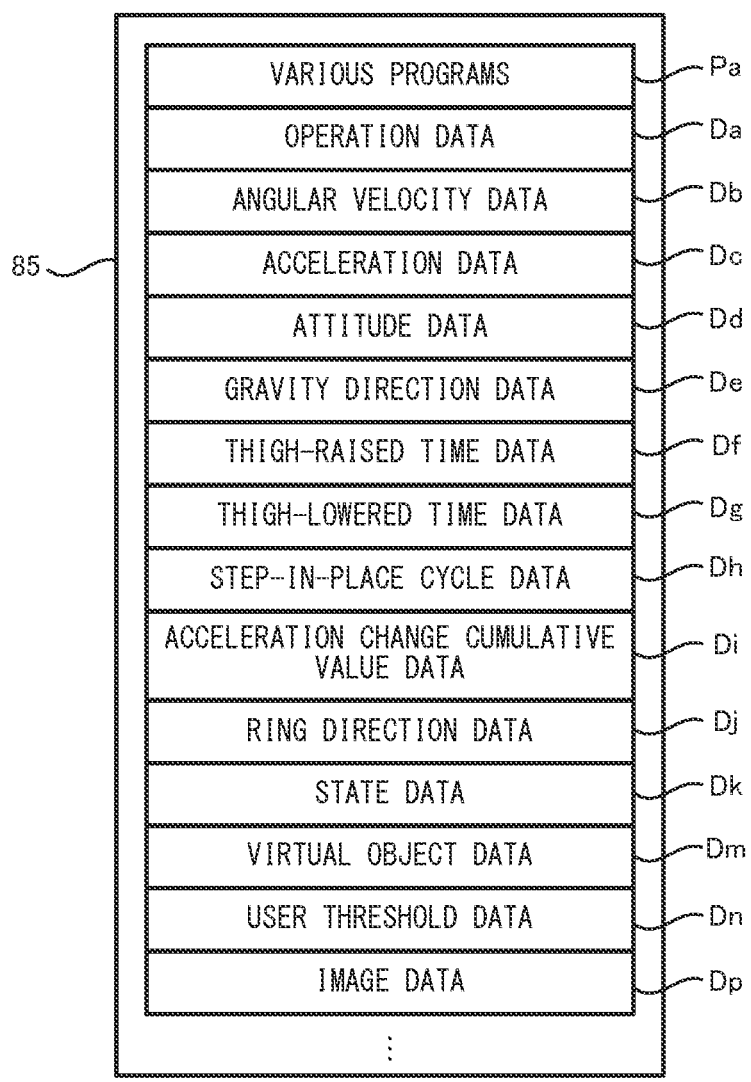
FIG. 17 is a diagram showing a non-limiting example of a data area that is set in a DRAM 85 of the main body apparatus 2.

Next, referring to FIG. 17 to FIG. 24, a specific example of processes to be executed on the game system 1 in the present embodiment will be described. FIG. 17 is a diagram showing an example of a data area that is set in the DRAM 85 of the main body apparatus 2 in the present embodiment. Note that although the DRAM 85 stores data to be used in other processes, in addition to the data shown in FIG. 17, the detailed description thereof will be omitted.

Various programs Pa to be executed on the game system 1 are stored in the program storage area of the DRAM 85. In the present embodiment, the various programs Pa stored include a communication program for realizing wireless communication between the left controller 3 and the right controller 4, and application programs (e.g., game programs) for performing information processes based on data obtained from the left controller 3 and the right controller 4 and the attitude of the main body apparatus 2, etc. Note that the various programs Pa may be stored in advance in the flash memory 84, may be obtained from a storage medium attachable/detachable to/from the game system 1 (e.g., a predetermined type of a storage medium attached to the slot 23) and stored in the DRAM 85, or may be obtained from another apparatus via a network such as the Internet and stored in the DRAM 85. The processor 81 executes the various programs Pa stored in the DRAM 85.

The data storage area of the DRAM 85 stores various data for use in processes such as communication processes and information processes to be executed on the game system 1. In the present embodiment, the DRAM 85 stores the operation data Da, the angular velocity data Db, the acceleration data Dc, the attitude data Dd, the gravity direction data De, the thigh-raised time data Df, the thigh-lowered time data Dg, the step-in-place cycle data Dh, the acceleration change cumulative value data Di, the ring direction data Dj, the state data Dk, the virtual object data Dm, the user threshold data Dn and the image data Do, etc.

The operation data Da is operation data obtained as necessary from the left controller 3 and the right controller 4. As described above, operation data transmitted from the left controller 3 and the right controller 4 includes information (specifically, operation-related information and detection results from the sensors) from the input sections (specifically, the buttons, the analog stick, the sensors), and the strain value representing the deformation of the ring-shaped portion 201 of the ring-shaped extension apparatus 5. In the present embodiment, operation data is transmitted at a predetermined cycle from the left controller 3 and the right controller 4 via wireless communication, and the operation data Da is updated as necessary by using the received operation data. Note that the update cycle of the operation data Da may be every frame, which is the cycle of processes executed on the game system 1, or may be updated with a cycle with which operation data is transmitted via wireless communication.

Of the operation data obtained from the left controller 3 and the right controller 4, the angular velocity data Db is data representing the histories of angular velocities of the left controller 3 and the right controller 4 that have been obtained up until a predetermined amount of time before the current point in time. For example, the angular velocity data Db includes the histories of data representing the angular velocities about the xyz axes of the left controller 3 and the right controller 4.

Of the operation data obtained from the left controller 3 and the right controller 4, the acceleration data Dc is data representing the histories of accelerations of the left controller 3 and the right controller 4 that has been obtained up until a predetermined amount of time before the current point in time. For example, the acceleration data Dc includes the histories of data representing the accelerations in the xyz-axis directions of the left controller 3 and the right controller 4.

The attitude data Dd is data representing the attitude of the left controller 3 and the right controller 4 in the real space. As an example, the attitude data Dd is data representing the xyz-axis directions of the left controller 3 and the right controller 4 in the real space (e.g., angles with respect to the xyz axes in the real space).

The gravity direction data De is data representing the directions of gravity acceleration acting upon the left controller 3 and the right controller 4.

The thigh-raised time data Df is data representing the point in time when the user raised the leg (thigh) in the step-in-place operation. The thigh-lowered time data Dg is data representing the point in time when the user lowered the leg (thigh) in the step-in-place operation. The step-in-place cycle data Dh is data representing the cycle of the step-in-place operation performed by the user and the amount of time from the thigh-raised time to the thigh-lowered time.

The acceleration change cumulative value data Di is data representing the cumulative value of the amount of change in acceleration of the left controller 3 for a predetermined period of time.

The ring direction data Dj is data representing the ring direction of the ring-shaped extension apparatus 5 in the real space.

The state data Dk is data representing the state of the step-in-place operation by the user, indicating one of "stationary state", "walking state", "jogging state" and "running state", for example.

The virtual object data Dm includes data representing the position, state, attitude, action, etc., of the virtual object PO arranged in the virtual game space, and data representing the position, state, attitude, action, etc., of another virtual object.

The user threshold data Dn is data representing the threshold of each user set in advance in order to determine the "jogging state" and "running state" for each user.

The image data Do is data for displaying an image (e.g., the image of the virtual object PO, the image of another virtual object, the field image, the background image, etc.) on the display screen.

Figure 18:
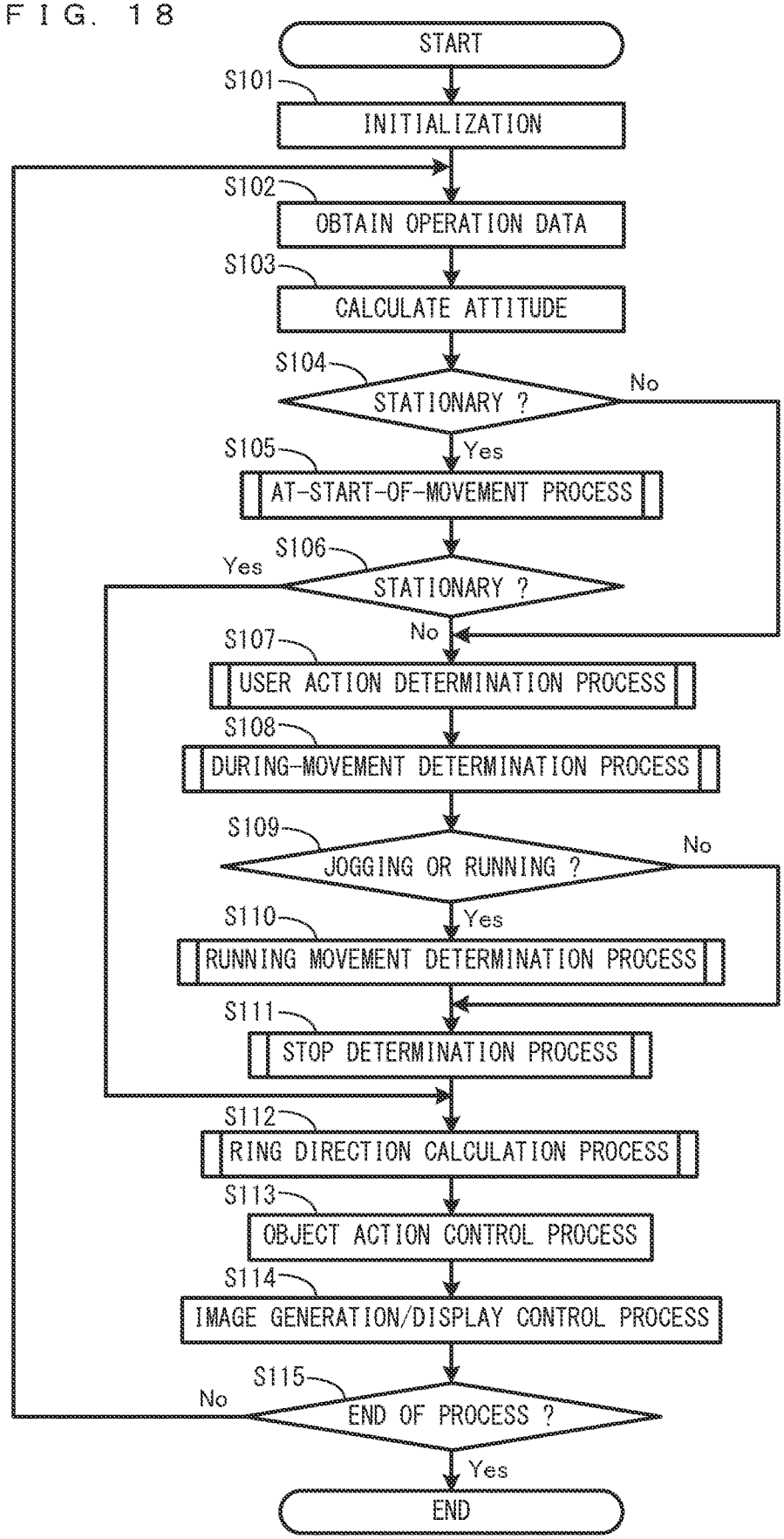
FIG. 18 is a flow chart showing a non-limiting example of information processes executed on the game system 1.
Figure 19:
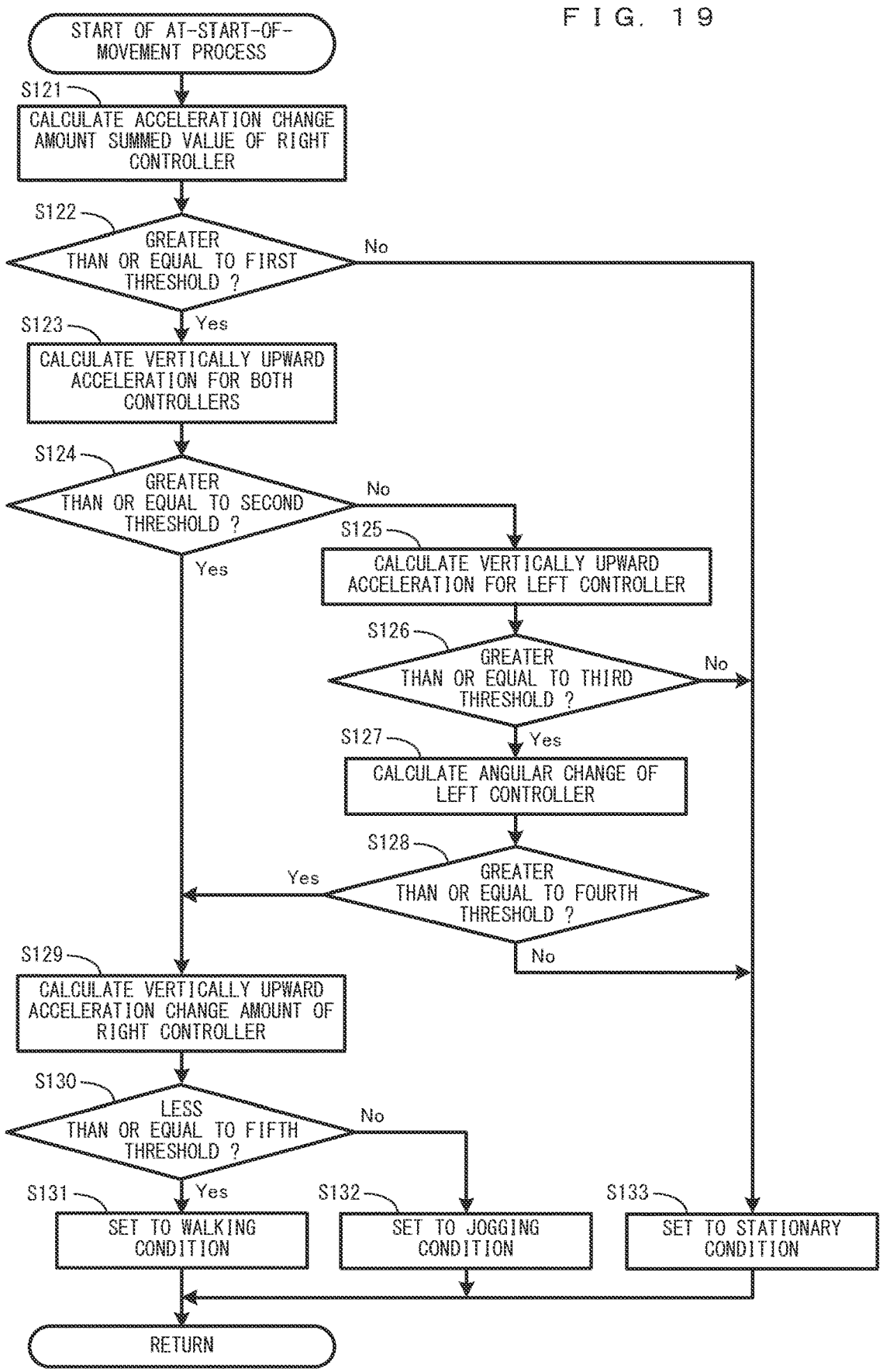
FIG. 19 is a sub-routine showing a detailed non-limiting example of an at-start-of-movement process performed in step S105 of FIG. 18.
Figure 20:
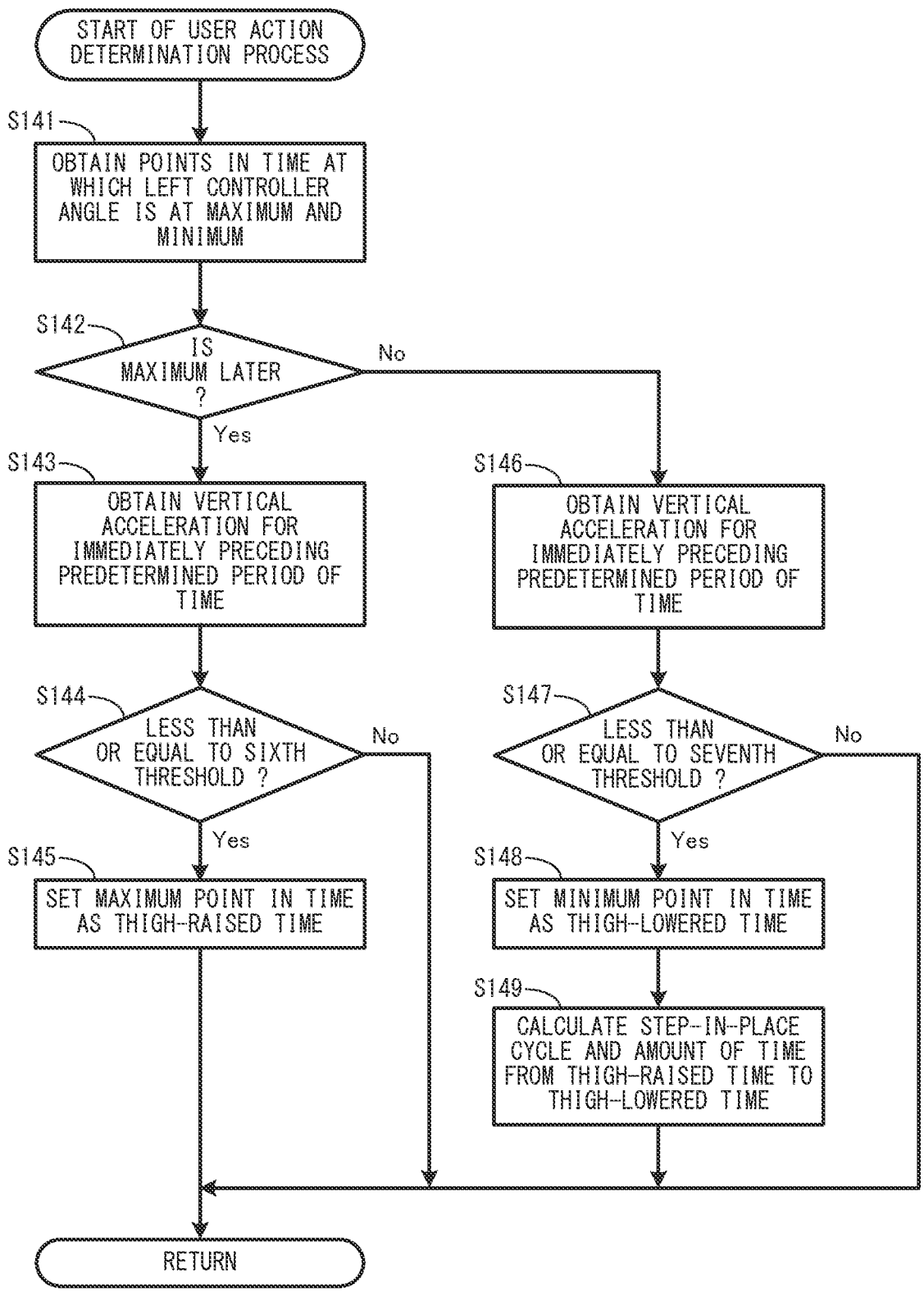
FIG. 20 is a sub-routine showing a detailed non-limiting example of a user action determination process performed in step S107 of FIG. 18.
Figure 22:
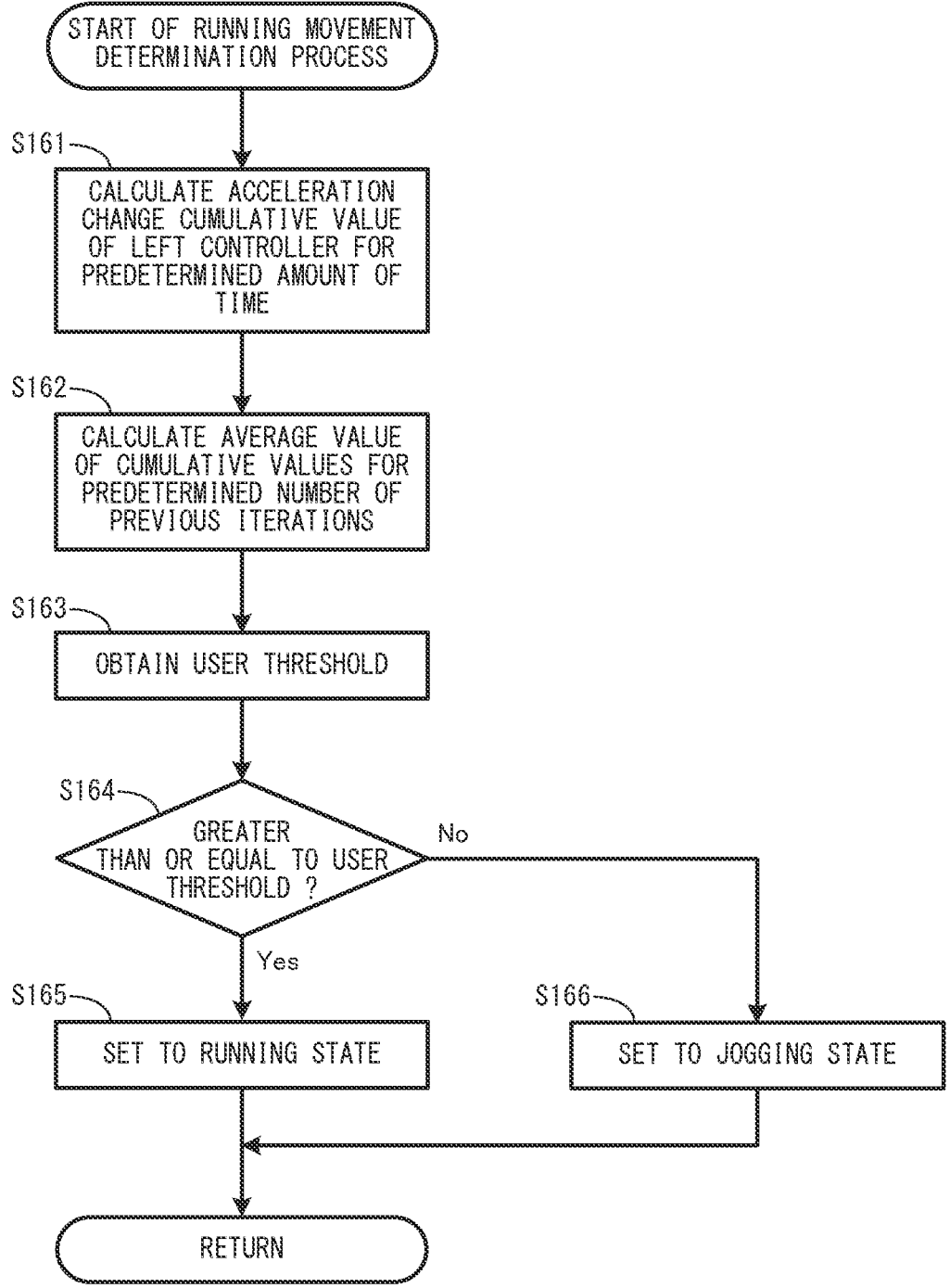
FIG. 22 is a sub-routine showing a detailed non-limiting example of a running movement determination process performed in step S110 of FIG. 18.
Figure 23:
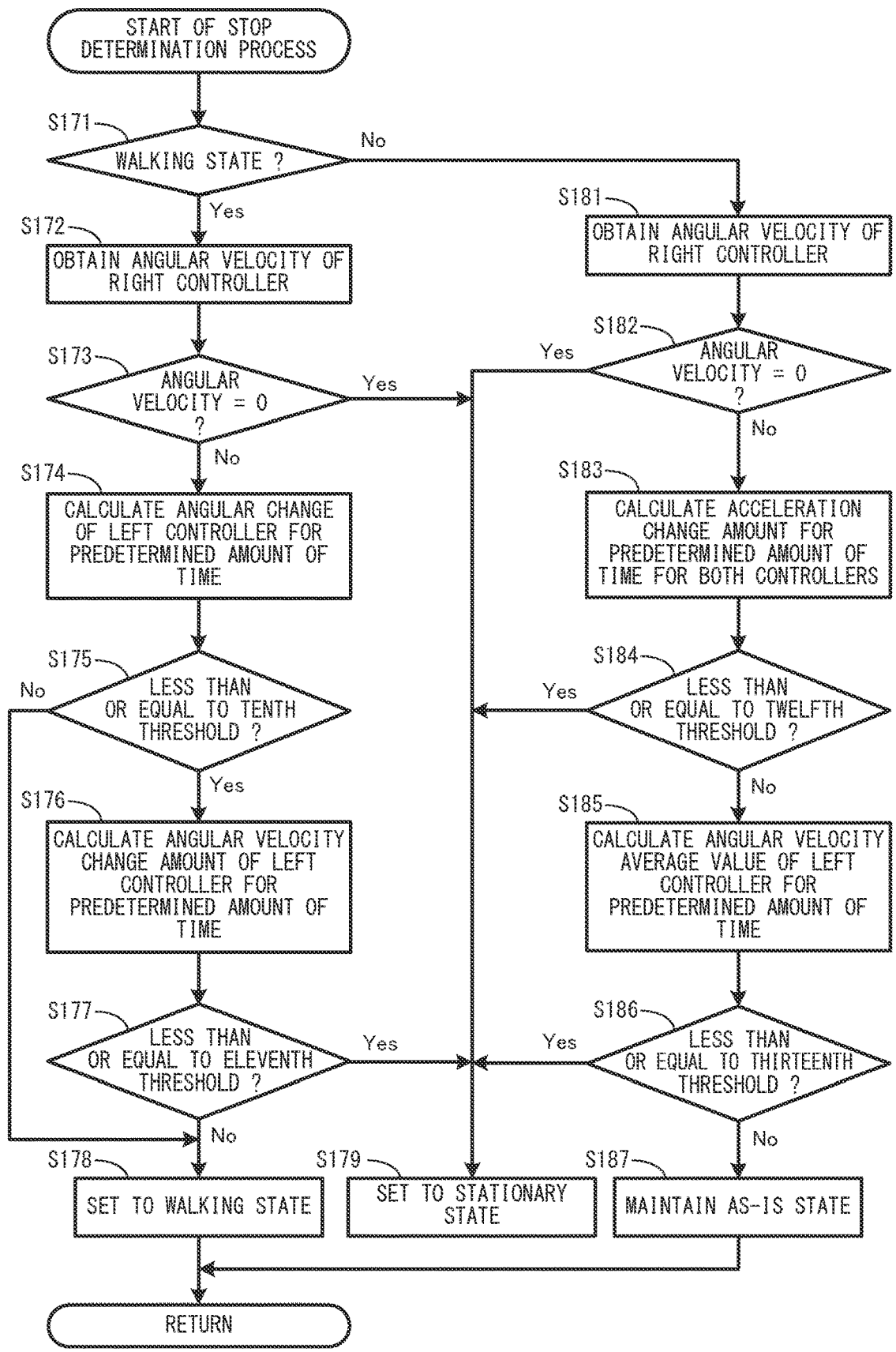
FIG. 23 is a sub-routine showing a detailed non-limiting example of a stop determination process performed in step S111 of FIG. 18.
Figure 24:
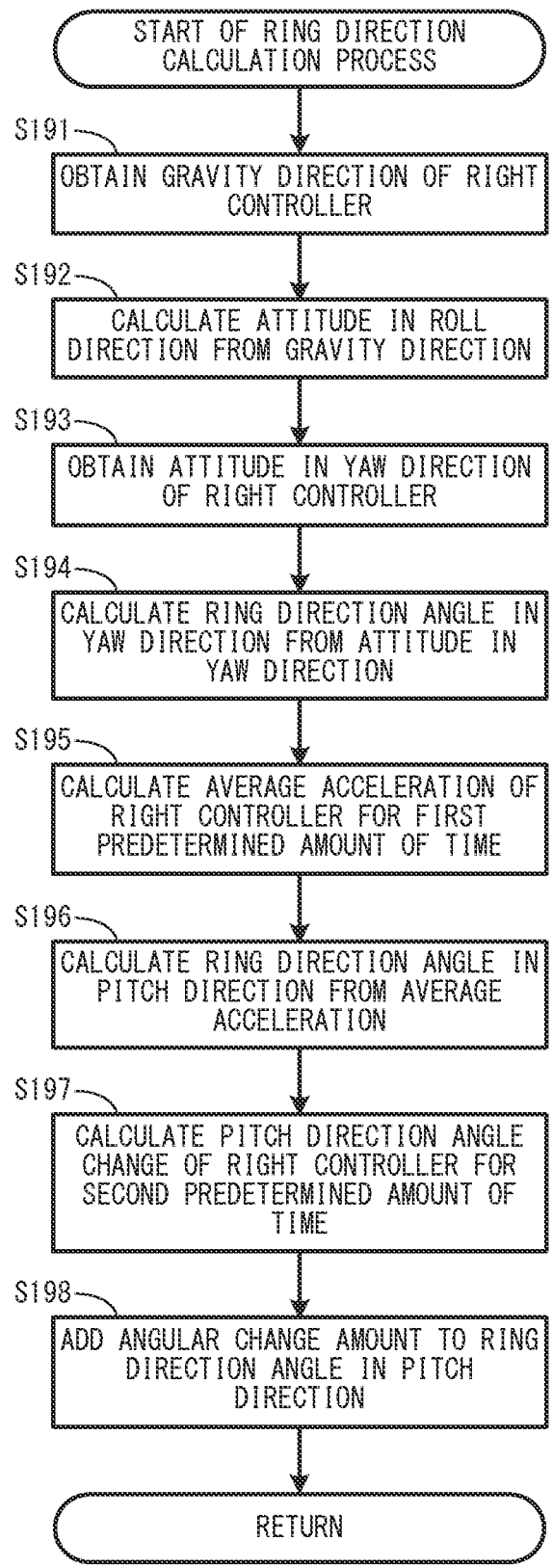
FIG. 24 is a sub-routine showing a detailed non-limiting example of a ring direction determination process performed in step S112 of FIG. 18.

Next, referring to FIG. 18 to FIG. 24, a detailed example of an information process of the present embodiment will be described. FIG. 18 is a flow chart showing an example of an information process executed on the game system 1. FIG. 19 is a sub-routine showing a detailed example of an at-start-of-movement process performed in step S105 of FIG. 18. FIG. 20 is a sub-routine showing a detailed example of a user action determination process performed in step S107 of FIG. 18. FIG. 21 is a sub-routine showing a detailed example of a during-movement determination process performed in step S108 of FIG. 18. FIG. 22 is a sub-routine showing a detailed example of an object deformation process performed in step S110 of FIG. 18. FIG. 23 is a sub-routine showing a detailed example of a stop determination process performed in step S111 of FIG. 18. FIG. 24 is a sub-routine showing a detailed example of a ring direction determination process performed in step S112 of FIG. 18. In the present embodiment, the series of processes shown in FIG. 18 to FIG. 24 is performed as the processor 81 executes a communication program and a predetermined application program (game program) included in the various programs Pa. The information process shown in FIG. 18 to FIG. 24 may be started at any point in time.

Note that the processes of the steps shown in FIG. 18 to FIG. 24 are merely illustrative, and the order of steps to be performed may be switched around or other processes may be executed in addition to (or instead of) the processes of the steps, as long as similar results are obtained. While the present embodiment is described assuming that the processes of the steps of the flow chart are executed by the processor 81, processes of some of the steps of the flow chart may be executed by a processor or a dedicated circuit other than the processor 81. Some of the processes executed on the main body apparatus 2 may be executed by another information processing device capable of communicating with the main body apparatus 2 (e.g., a server capable of communicating with the main body apparatus 2 via a network). That is, the processes shown in FIG. 18 to FIG. 24 may be executed through a cooperation of a plurality of information processing apparatuses including the main body apparatus 2.

In FIG. 18, the processor 81 performs an initialization for the information process (step S101) and proceeds to the next step. For example, in the initialization, the processor 81 initializes parameters used for performing processes to be described below. For example, the processor 81 sets the user to perform the information process (game process), and initially sets the user threshold data Dn by using a user threshold that has been set by the user performing an operation in advance (a step-in-place action) before the start of the game for distinguishing between the step-in-place action of "jogging" and the step-in-place action of "running" The processor 81 defines the world coordinate axes in the virtual game space, produces the initial state of the virtual game space by arranging various objects (including the virtual object PO) in the virtual game space, and updates the virtual object data Dm by using the position, direction and attitude, etc., of each object. The processor 81 initially sets the virtual object PO to the stationary state and updates the state data Dk.

Next, the processor 81 obtains the operation data from the left controller 3 and the right controller 4 and updates the operation data Da (step S102), and proceeds to the next step. Note that in step S102, of the operation data obtained from the left controller 3 and the right controller 4, the processor 81 stores, in the angular velocity data Db, data representing the angular velocities of the left controller 3 and the right controller 4. In step S102, of the operation data obtained from the left controller 3 and the right controller 4, the processor 81 stores, in the acceleration data Dc, data representing the accelerations of the left controller 3 and the right controller 4.

Next, the processor 81 calculates the attitude of the left controller 3 and the right controller 4 (step S103), and proceeds to the next step. For example, using the angular velocity data stored in the angular velocity data Db, the processor 81 obtains the angular velocities about the xyz axes of the left controller 3 and the right controller 4. Then, the processor 81 rotates, in accordance with the obtained angular velocities, the xyz axes which are based on the direction of gravity acceleration in the attitudes of the left controller 3 and the right controller 4 indicated by the attitude data Dd, and updates the data representing the attitudes of the left controller 3 and the right controller 4 in the attitude data Dd by using the directions of the xyz axes with respect to the rotated direction of gravity acceleration. Using the angular velocity data stored in the acceleration data Dc, the processor 81 calculates the directions of gravity acceleration acting upon the left controller 3 and the right controller 4, and updates the gravity direction data De. Note that any method may be used for extracting the gravity acceleration, and average acceleration components acting on the left controller 3 and the right controller 4 may be calculated to extract the acceleration component as the gravity acceleration, for example. The processor 81 may correct as necessary the attitudes of the left controller 3 and the right controller 4 indicated by the attitude data Dd by using the directions of gravity acceleration of the left controller 3 and the right controller 4 indicated by the gravity direction data De.

Next, the processor 81 determines whether the step-in-place action by the user is in the stationary state (step S104). For example, when the state data Dk indicates the stationary state, the processor 81 returns affirmative in step S104. Then, when the step-in-place action by the user is in the stationary state, the processor 81 proceeds to step S105. On the other hand, when the step-in-place action by the user is not in the stationary state, the processor 81 proceeds to step S107.

In step S105, the processor 81 performs the at-start-of-movement process (step S105), and proceeds to step S106. Referring to FIG. 19, the at-start-of-movement process to be performed in step S105 will now be described.

In FIG. 19, the processor 81 calculates the total sum of the amount of change in acceleration of the right controller 4 for a predetermined period of time (step S121), and proceeds to the next step. For example, the processor 81 calculates the amount of change in acceleration of the right controller 4 for each frame for an immediately preceding predetermined period of time (e.g., 5 frames) by using the acceleration data Dc, and adds together all the amounts of change to obtain the total sum.

Next, the processor 81 determines the total sum of the amount of change calculated in step S121 is greater than or equal to the first threshold (e.g., 1.5 G) (step S122; the first start-of-movement condition). Then, when the total sum of the amount of change is greater than or equal to the first threshold, the processor 81 proceeds to step S123. On the other hand, when the total sum of the amount of change is less than the first threshold, the processor 81 proceeds to step S133.

In step S123, the processor 81 calculates the acceleration in the vertically upward direction in the real space, excluding the gravity accelerations of the left controller 3 and the right controller 4, and proceeds to the next step. For example, the processor 81 obtains the acceleration in the vertically upward direction in the real space (the acceleration in the opposite direction from the gravity acceleration) of each of the left controller 3 and the right controller 4 by using the acceleration data Dc and the gravity direction data De, and subtracts the gravity acceleration from the acceleration in the vertically upward direction.

Next, the processor 81 determines whether the acceleration in the vertically upward direction of each of the left controller 3 and the right controller 4 calculated in step S123 is greater than or equal to the second threshold (e.g., 0.2 G) (step S124; the second start-of-movement condition). Then, when the acceleration in the vertically upward direction is less than the second threshold, the processor 81 proceeds to step S125. On the other hand, when the acceleration in the vertically upward direction is greater than or equal to the second threshold, the processor 81 proceeds to step S129.

In step S125, the processor 81 calculates the value of the acceleration in the vertically upward direction in the real space, excluding the gravity acceleration of the left controller 3, and proceeds to the next step. For example, the processor 81 obtains the acceleration in the vertically upward direction in the real space (the acceleration in the opposite direction from the gravity acceleration) of the left controller 3 by using the acceleration data Dc and the gravity direction data De, and subtracts the gravity acceleration from the acceleration in the vertically upward direction.

Next, the processor 81 determines whether the acceleration in the vertically upward direction of the left controller 3 calculated in step S125 is greater than or equal to the third threshold (e.g., 0.1 G) (step S126; the third start-of-movement condition). Then, when the acceleration in the vertically upward direction is greater than or equal to the third threshold, the processor 81 proceeds to step S127. On the other hand, when the acceleration in the vertically upward direction is less than the third threshold, the processor 81 proceeds to step S133.

In step S127, the processor 81 calculates the angular change for a predetermined period of time when the left controller 3 swings in the front-rear direction, and proceeds to the next step. For example, the processor 81 obtains the angular velocity of the left controller 3 in the front-rear direction of the user (e.g., about the x axis of the left controller 3) for an immediately preceding predetermined period of time by using the angular velocity data Db, and calculates the angular change in the front-rear direction by using the angular velocity.

Next, the processor 81 determines whether the angular change of the left controller 3 calculated in step S127 is greater than or equal to the fourth threshold (e.g., 15°) (step S128; the third start-of-movement condition). Then, when the angular change is greater than or equal to the fourth threshold, the processor 81 proceeds to step S129. On the other hand, when the angular change is less than the fourth threshold, the processor 81 proceeds to step S133.

In step S129, the processor 81 calculates the amount of change in acceleration in the vertically upward direction of the right controller 4 for a predetermined period of time, and proceeds to the next step. For example, the processor 81 calculates the amount of change in acceleration in the vertically upward direction of the right controller 4 for an immediately preceding predetermined period of time (e.g., 15 frames) by using the acceleration data Dc and the gravity direction data De.

Next, the processor 81 determines whether the amount of change in acceleration in the vertically upward direction of the right controller 4 calculated in step S129 is less than or equal to the fifth threshold (e.g., 1.2 G) (step S130; the at-start-of-movement action determination condition). Then, when the amount of change in acceleration in the vertically upward direction is less than or equal to the fifth threshold, the processor 81 proceeds to step S131. On the other hand, when the amount of change in acceleration in the vertically upward direction is greater than the fifth threshold, the processor 81 proceeds to step S132.

In step S131, the processor 81 sets the step-in-place action by the user to the walking state, and exits the process of the sub-routine. For example, the processor 81 updates the state data Dk by setting the step-in-place action by the user to the walking state.

On the other hand, in step S132, the processor 81 sets the step-in-place action by the user to the jogging state, and exits the process of the sub-routine. For example, the processor 81 updates the state data Dk by setting the step-in-place action by the user to the jogging state.

In step S133, the processor 81 sets the step-in-place action by the user to the stationary state, and exits the process of the sub-routine. For example, the processor 81 updates the state data Dk by setting the step-in-place action by the user to the stationary state.

As is clear from steps S121 to S128, when the first start-of-movement condition and the second start-of-movement condition are both satisfied (step S122 and step S124 both returning affirmative) or when the first start-of-movement condition and the third start-of-movement condition are both satisfied (step S122, step S126 and step S128 all returning affirmative), the state of the user is changed to a state other than the stationary state, without performing the process of step S133. That is, it is determined that the user has started moving from the stationary state. Thus, the start of movement by the user is determined. The process of steps S129 to S132 is a process of using the at-start-of-movement action determination condition to determine the action with which the user has started moving, after it is determined in the start-of-movement determination process of steps S121 to S133 that the user has started moving from the stationary state.

Referring back to FIG. 18, after the at-start-of-movement process of step S105, the processor 81 determines whether the step-in-place action by the user is in the stationary state (step S106). For example, when the state data Dk indicates the stationary state, the processor 81 returns affirmative in step S106. Then, when the step-in-place action by the user is not in the stationary state, the processor 81 proceeds to step S107. On the other hand, when the step-in-place action by the user is in the stationary state, the processor 81 proceeds to step S112.

In step S107, the processor 81 performs the user action determination process (step S107), and proceeds to step S108. Referring to FIG. 20, the user action determination process performed in step S107 will now be described.

In FIG. 20, the processor 81 obtains the maximum value and the minimum value of the angle of the left controller 3 in the front-rear direction (e.g., about the x-axis direction) for an immediately preceding predetermined period of time (e.g., 15 frames) (step S141), and proceeds to the next step. For example, using the angular velocity data Db, the processor 81 obtains the angular velocity of the left controller 3 in the front-rear direction of the user (e.g., about the x axis of the left controller 3) for an immediately preceding predetermined period of time, and obtains the maximum value and the minimum value of the angle in the front-rear direction calculated from the angular velocity (the angle that increases as the angle of knee bend increases).

Next, the processor 81 determines whether the maximum value is obtained at a later point in time than the minimum value obtained in step S141 (step S142; the first thigh-raised determination condition, the first thigh-lowered determination condition). Then, when the maximum value is obtained at a later point in time, the processor 81 proceeds to step S143. On the other hand, when the minimum value is obtained at a later point in time, the processor 81 proceeds to step S146.

In step S143, the processor 81 obtains the acceleration in the vertical direction of the left controller 3 for an immediately preceding predetermined period of time, and proceeds to the next step. For example, by using the acceleration data Dc, the processor 81 obtains the acceleration in the vertical direction of the left controller 3 for an immediately preceding predetermined period of time (e.g., 15 frames).

Next, the processor 81 determines whether the acceleration obtained in step S143 is less than or equal to the sixth threshold (e.g., 0.8 G) (step S144; the second thigh-raised determination condition). Then, when the acceleration obtained in step S143 is less than or equal to the sixth threshold, the processor 81 determines that the left controller 3 is accelerating in the vertically upward direction in the real space, and proceeds to step S145. On the other hand, when the acceleration obtained in step S143 is greater than the sixth threshold, the processor 81 determines that the left controller 3 is not accelerating in the vertically upward direction in the real space, and exits the process of the sub-routine.

In step S145, the processor 81 sets, as the thigh-raised time, the point in time when the maximum value of the angle of the left controller 3 in the front-rear direction (e.g., about the x-axis direction) is obtained, and exits the process of the sub-routine. For example, the processor 81 updates the thigh-raised time data Df by setting, as the thigh-raised time, the point in time when the maximum value is obtained in step S141.

On the other hand, in step S146, the processor 81 obtains the acceleration in the vertical direction of the left controller 3 for an immediately preceding predetermined period of time, and proceeds to the next step. For example, by using the acceleration data Dc, the processor 81 obtains the acceleration in the vertical direction of the left controller 3 for an immediately preceding predetermined period of time (e.g., 15 frames).

Next, the processor 81 determines whether the acceleration obtained in step S146 is greater than or equal to the seventh threshold (e.g., 1.2 G) (step S147; the second thigh-lowered determination condition). Then, when the acceleration obtained in step S146 is greater than or equal to the seventh threshold, the processor 81 determines that the left controller 3 is accelerating in the vertical direction in the real space, and proceeds to step S148. On the other hand, when the acceleration obtained in step S146 is less than the seventh threshold, the processor 81 determines that the left controller 3 is not accelerating in the vertical direction in the real space, and exits the process of the sub-routine.

In step S148, the processor 81 sets, as the thigh-lowered time, a point in time when the minimum value of the angle of the left controller 3 in the front-rear direction (e.g., about the x-axis direction), and proceeds to the next step. For example, the processor 81 sets the point in time when the minimum value is obtained in step S141 as the current thigh-lowered time, and when the current thigh-lowered time is a new point in time, the processor 81 adds data representing the thigh-lowered time to the thigh-lowered time data Dg.

Next, the processor 81 calculates the step-in-place cycle and the amount of time from the thigh-raised time to the thigh-lowered time (step S149), and exits the process of the sub-routine. For example, the processor 81 calculates, as the step-in-place cycle, the amount of time from the previous thigh-lowered time to the current thigh-lowered time indicated by the thigh-lowered time data Dg. The processor 81 calculates the amount of time from the thigh-raised time indicated by the thigh-raised time data Df to the current thigh-lowered time indicated by the thigh-lowered time data Dg. Then, the processor 81 updates the step-in-place cycle data Dh using the calculated step-in-place cycle, and the calculated amount of time from the thigh-raised time to the thigh-lowered time.

Referring back to FIG. 18, after the user action determination process of step S107, the processor 81 makes an action determination after the start of the step-in-place action by the user (during-movement action determination) (step S108), and proceeds to step S109. Referring to FIG. 21, the during-movement determination process performed in step S108 will now be described.

In FIG. 21, the processor 81 obtains the step-in-place cycle of the user (step S151), and proceeds to the next step. For example, by using the step-in-place cycle data Dh, the processor 81 obtains the step-in-place cycle during the step-in-place operation by the user (specifically, the cycle of raising and lowering the left thigh of the user to which the belt-shaped extension apparatus 6 is fastened).

Next, the processor 81 determines whether the step-in-place cycle obtained in step S151 is greater than or equal to the eighth threshold (e.g., 60 frames) (step S152; the first post-start-of-movement action determination condition). Then, when the step-in-place cycle is shorter than the eighth threshold, the processor 81 proceeds to step S158. On the other hand, when the step-in-place cycle is greater than or equal to the eighth threshold, the processor 81 proceeds to step S153.

In step S153, the processor 81 obtains the amount of time from the thigh-raised time to the thigh-lowered time of the user, and proceeds to the next step. For example, by using the step-in-place cycle data Dh, the processor 81 obtains the amount of time from the thigh-raised time to the thigh-lowered time in the step-in-place operation by the user.

Next, the processor 81 determines whether the amount of time from the thigh-raised time to the thigh-lowered time obtained in step S153 is greater than or equal to the ninth threshold (e.g., 20 frames) (step S154; the second post-start-of-movement action determination condition). Then, when the amount of time from the thigh-raised time to the thigh-lowered time is shorter than the ninth threshold, the processor 81 proceeds to step S158. On the other hand, when the amount of time from the thigh-raised time to the thigh-lowered time is greater than or equal to the ninth threshold, the processor 81 proceeds to step S155.

In step S156, the processor 81 calculates the amount of change in acceleration in the vertically upward direction of the right controller 4 for a predetermined period of time, and proceeds to the next step. For example, the processor 81 calculates the amount of change in acceleration in the vertically upward direction of the right controller 4 for an immediately preceding predetermined period of time (e.g., 15 frames) by using the acceleration data Dc and the gravity direction data De.

Next, the processor 81 determines whether the amount of change in acceleration in the vertically upward direction of the right controller 4 calculated in step S156 is less than or equal to the fifth threshold (e.g., 1.2 G) (step S157; the third post-start-of-movement action determination condition). Then, when the amount of change in acceleration in the vertically upward direction is less than or equal to the fifth threshold, the processor 81 proceeds to step S157. On the other hand, when the amount of change in acceleration in the vertically upward direction is greater than the fifth threshold, the processor 81 proceeds to step S158.

In step S158, the processor 81 sets the step-in-place action by the user to the jogging state, and exits the process of the sub-routine. For example, the processor 81 updates the state data Dk by setting the step-in-place action by the user to the jogging state.

On the other hand, in step S157, the processor 81 determines whether the step-in-place action by the user is the jogging state. For example, when the state data Dk indicates the jogging state, the processor 81 returns affirmative in step S157. Then, when the step-in-place action by the user is not the jogging state, the processor 81 proceeds to step S159. On the other hand, when the step-in-place action by the user is the jogging state, the processor 81 proceeds to step S160.

In step S159, the processor 81 sets the step-in-place action by the user to the walking state, and exits the process of the sub-routine. For example, the processor 81 updates the state data Dk by setting the step-in-place action by the user to the walking state.

In step S160, the processor 81 sets the step-in-place action by the user to the stationary state, and exits the process of the sub-routine. For example, the processor 81 updates the state data Dk by setting the step-in-place action by the user to the stationary state.

The during-movement determination process in step S108 described above is a process that is performed when the step-in-place action by the user is not the stationary state, i.e., when the step-in-place action by the user is the walking state, the jogging state or the running state. As is clear from steps S151 to S160, when the first post-start-of-movement action determination condition, the second post-start-of-movement action determination condition and the third post-start-of-movement action determination condition are all satisfied (step S152, step S154 and step S156 all returning affirmative), it is determined that the step-in-place action by the user is the walking state. Then, when the step-in-place action by the user is changed from the jogging state to the walking state through steps S151 to S156, it is changed once to the stationary state as a result of the affirmative determination in step S157. Note that since the during-movement determination process in step S108 is performed during the step-in-place action by the user, the process uses operation data that is obtained for a relatively long period of time as compared with the start-of-movement determination process in the at-start-of-movement process in step S105, and it is therefore possible to more accurately determine the step-in-place action by the user.

Referring back to FIG. 18, after the during-movement determination process of step S108, the processor 81 determines whether the step-in-place action by the user is the jogging state or the running state (step S109). For example, when the state data Dk indicates one of the jogging state and the running state, the processor 81 returns affirmative in step S109. Then, when the step-in-place action by the user is the jogging state or the running state, the processor 81 proceeds to step S110. On the other hand, when the step-in-place action by the user is not the jogging state or the running state, the processor 81 proceeds to step S111.

In step S110, the processor 81 performs a running movement determination process of determining whether the user is in the jogging state or the running state, and proceeds to step S111. Referring to FIG. 22, the running movement determination process performed in step S110 will now be described.

In FIG. 22, the processor 81 calculates the cumulative value obtained by accumulating the amount of change in the acceleration of the left controller 3 for an immediately preceding predetermined amount of time (e.g., for 60 frames) (step S161), and proceeds to the next step. For example, by using the acceleration data Dc, the processor 81 accumulates the amount of change in the acceleration of the left controller 3 for each frame for a predetermined amount of time (e.g., for 60 frames), and adds the obtained cumulative value, as the cumulative value obtained for the current frame, to the acceleration change cumulative value data Di.

Next, the processor 81 calculates the average value of the cumulative values previously calculated for a predetermined period of time (e.g., for 30 frames) (step S162), and proceeds to the next step. For example, the processor 81 obtains cumulative values for an immediately preceding predetermined period of time including the current frame from the cumulative values stored in the acceleration change cumulative value data Di, and calculates the average value of the cumulative values.

Next, the processor 81 obtains the user threshold that is set in advance for the current user in order to distinguish between the "jogging state" and the "running state" for each user (step S163), and proceeds to the next step. For example, with reference to the user threshold data Dn, the processor 81 obtains the user threshold that is set in advance for the current user.

Next, the processor 81 determines whether the average value calculated in step S162 is greater than or equal to the user threshold (step S164). Then, when the average value is greater than or equal to the user threshold, the processor 81 proceeds to step S165. On the other hand, when the average value is less than the user threshold, the processor 81 proceeds to step S166.

In step S165, the processor 81 sets the step-in-place action by the user to the running state, and exits the process of the sub-routine. For example, the processor 81 updates the state data Dk by setting the step-in-place action by the user to the running state.

On the other hand, in step S156, the processor 81 sets the step-in-place action by the user to the jogging state, and exits the process of the sub-routine. For example, the processor 81 updates the state data Dk by setting the step-in-place action by the user to the jogging state.

Referring back to FIG. 18, after the running movement determination process of step S110 or after step S109 returns negative, the processor 81 performs the stop determination process of determining whether the user has transitioned from the step-in-place state to the stationary state (step S111), and proceeds to step S112. Referring to FIG. 23, the stop determination process performed in step S111 will now be described.

In FIG. 23, the processor 81 determines whether the step-in-place action by the user is the walking state (step S171). For example, when the state data Dk indicates the walking state, the processor 81 returns affirmative in step S171. Then, when the step-in-place action by the user is the walking state, the processor 81 proceeds to step S172. On the other hand, when the step-in-place action by the user is not the walking state, the processor 81 proceeds to step S181.

In step S172, the processor 81 obtains the angular velocity of the right controller 4, and proceeds to the next step. For example, by using the angular velocity data Db, the processor 81 obtains the angular velocity of the right controller 4.

Next, the processor 81 determines whether the angular velocity obtained in step S172 is 0 (step S173; the first stop action determination condition). Then, when the angular velocity obtained in step S172 is not 0, the processor 81 proceeds to step S174. On the other hand, when the angular velocity obtained in step S172 is 0, the processor 81 proceeds to step S179.

In step S174, the processor 81 calculates the angular change of the left controller 3 for an immediately preceding predetermined period of time (e.g., 90 frames), and proceeds to the next step. For example, by using the angular velocity data Db, the processor 81 obtains the angular velocity of the left controller 3 during an immediately preceding predetermined period of time, and calculates the angular change of the left controller 3 for the predetermined period of time by using the angular velocity.

Next, the processor 81 determines whether the angular change calculated in step S174 is less than or equal to the tenth threshold (e.g., 10°)(step S175; the second stop action determination condition). Then, when the angular change calculated in step S174 is less than or equal to the tenth threshold, the processor 81 proceeds to step S176. On the other hand, when the angular change calculated in step S174 is greater than the tenth threshold, the processor 81 proceeds to step S178.

In step S176, the processor 81 calculates the amount of change in the angular velocity of the left controller 3 for an immediately preceding predetermined period of time (e.g., 10 frames), and proceeds to the next step. For example, by using the angular velocity data Db, the processor 81 obtains the angular velocity of the left controller 3 during an immediately preceding predetermined period of time, and calculates the amount of change in the angular velocity of the left controller 3 for the predetermined period of time by using the angular velocity.

Next, the processor 81 determines whether the amount of change in the angular velocity calculated in step S176 is less than or equal to the eleventh threshold (e.g., 0.01) (step S177; the second stop action determination condition). Then, when the amount of change in the angular velocity calculated in step S176 is less than or equal to the eleventh threshold, the processor 81 proceeds to step S179. On the other hand, the amount of change in the angular velocity calculated in step S176 is greater than the eleventh threshold, the processor 81 proceeds to step S178.

In step S178, the processor 81 sets the step-in-place action by the user to the walking state, and exits the process of the sub-routine. For example, the processor 81 updates the state data Dk by setting the step-in-place action by the user to the walking state.

In step S179, the processor 81 sets the step-in-place action by the user to the stationary state, and exits the process of the sub-routine. For example, the processor 81 updates the state data Dk by setting the step-in-place action by the user to the stationary state.

As is clear from steps S171 to S179, when at least one of the first stop action determination condition and the second stop action determination condition is satisfied (step S173 returning affirmative or step S175 and step S177 both returning affirmative) while the user is performing the step-in-place action by walking (step S171 returning affirmative), the step-in-place action by the user is changed from the walking state to the stationary state. Herein, in order for the user to maintain the walking state without being determined to be in the stationary state, it is necessary to continuously produce an angular velocity of the right controller 4 so that step S173 returns negative so that neither of the first stop action determination condition and the second stop action determination condition holds, and to produce an angular change of the left controller 3 that is greater than the tenth threshold and produce a change in the angular velocity of the left controller 3 that is greater than or equal to the eleventh threshold for a predetermined amount of time so that one of step S175 and step S177 returns negative. Therefore, in order for the user to maintain the walking state without being determined to be in the stationary state, it is necessary to continuously move both of the left controller 3 (the belt-shaped extension apparatus 6) and the right controller 4 (the ring-shaped extension apparatus 5), thus promoting operations using the whole body of the user. This means that the first stop action determination condition and the second stop action determination condition serve also as the user action continuation determination condition.

On the other hand, in step S181, the processor 81 obtains the angular velocity of the right controller 4, and proceeds to the next step. For example, by using the angular velocity data Db, the processor 81 obtains the angular velocity of the right controller 4.

Next, the processor 81 determines whether the angular velocity obtained in step S181 is 0 (step S182; the third stop action determination condition). Then, when the angular velocity obtained in step S181 is not 0, the processor 81 proceeds to step S183. On the other hand, when the angular velocity obtained in step S181 is 0, the processor 81 proceeds to step S179.

In step S183, the processor 81 calculates the changes in acceleration of the left controller 3 and the right controller 4 for an immediately preceding predetermined period of time (e.g., 10 frames), and proceeds to the next step. For example, by using the acceleration data Dc, the processor 81 obtains the accelerations of the left controller 3 and the right controller 4 during an immediately preceding predetermined period of time, and calculates the changes in acceleration of the left controller 3 and the right controller 4 for the predetermined period of time by using the acceleration.

Next, the processor 81 determines whether the change in the acceleration of at least one of the left controller 3 and the right controller 4 calculated in step S183 is less than or equal to the twelfth threshold (step S184; the fourth stop action determination condition). Then, when one of the acceleration changes calculated in step S183 is less than or equal to the twelfth threshold, the processor 81 proceeds to step S179. On the other hand, when the acceleration changes calculated in step S183 are both greater than the twelfth threshold, the processor 81 proceeds to step S185.

In step S185, the processor 81 calculates the angular velocity average value of the left controller 3 for an immediately preceding predetermined period of time (e.g., 10 frames), and proceeds to the next step. For example, by using the angular velocity data Db, the processor 81 obtains the angular velocity of the left controller 3 during an immediately preceding predetermined period of time, and calculates the angular velocity average value of the left controller 3 for the predetermined period of time by using the angular velocity.

Next, the processor 81 determines whether the angular velocity average value calculated in step S185 is less than or equal to the thirteenth threshold (step S186; the fifth stop action determination condition). Then, when the angular velocity average value calculated in step S185 is less than or equal to the thirteenth threshold, the processor 81 proceeds to step S179. On the other hand, when the angular velocity average value calculated in step S185 is greater than the thirteenth threshold, the processor 81 proceeds to step S187.

In step S187, the processor 81 maintains the state of the step-in-place action by the user as it is, and exits the process of the sub-routine.

As is clear from step S171, step S179 and steps S181 to S187, when at least one of the third stop action determination condition to the fifth stop action determination condition is satisfied (step S182 returning affirmative, step S184 returning affirmative or step S186 returning affirmative) while the user is performing the step-in-place action by jogging or running (step S171 returning negative), the step-in-place action by the user is changed from the jogging state or the running state to the stationary state. Herein, in order for the user to maintain the jogging state or the running state without being determined to be in the stationary state, it is necessary to continuously produce an angular velocity of the right controller 4 so that step S182 returns negative so that none of the third stop action determination condition to the fifth stop action determination condition holds, to produce an acceleration greater than the twelfth threshold on both of the left controller 3 and the right controller 4 for a predetermined amount of time so that step S184 returns negative, and to move the left controller 3 so that the angular velocity average value is greater than the thirteenth threshold for a predetermined amount of time so that step S186 returns negative. Therefore, in order for the user to maintain the jogging state or the running state without being determined to be in the stationary state, it is necessary to continuously move both of the left controller 3 (the belt-shaped extension apparatus 6) and the right controller 4 (the ring-shaped extension apparatus 5), thus promoting operations using the whole body of the user. This means that the third stop action determination condition to the fifth stop action determination condition serve also as the user action continuation determination condition.

Referring back to FIG. 18, after the stop determination process of step S111 or after step S106 returns affirmative, the processor 81 performs a ring direction calculation process (step S112), and proceeds to step S113. Referring to FIG. 24, the ring direction calculation process performed in step S112 will now be described.

In FIG. 24, the processor 81 obtains the direction of gravity acceleration acting upon the right controller 4 (step S191), and proceeds to the next step. For example, with reference to the gravity direction data De, the processor 81 obtains the direction of gravity acceleration acting upon the right controller 4 at the current point in time.

Next, the processor 81 calculates the attitude of the ring-shaped extension apparatus 5 with respect to the roll direction by using the direction of gravity acceleration obtained in step S191 (step S192), and proceeds to the next step. For example, based on the direction of gravity acceleration acting upon the ring-shaped extension apparatus 5, the processor 81 calculates the attitude of the right controller 4 rotating with respect to the z axis, i.e., the attitude of the ring-shaped extension apparatus 5 in the roll direction as it is rotated about the ring axis of the ring-shaped portion 201 (the attitude that changes by rotating in the M3 direction shown in FIG. 16), and updates the attitude data Dd of the right controller 4 as necessary by using the calculation result.

Next, the processor 81 obtains the attitude of the right controller 4 (the ring-shaped extension apparatus 5) with respect to the yaw direction (step S193), and proceeds to the next step. For example, with reference to the attitude data Dd, the processor 81 obtains the attitude of the right controller 4 (the ring-shaped extension apparatus 5) with respect to the yaw direction, i.e., the attitude about the x-axis direction calculated based on the angular velocity about the x-axis direction (the angular velocity about the vertical direction).

Next, the processor 81 calculates the angle of the ring direction in the yaw direction based on the attitude in the yaw direction obtained in step S193 (step S194), and proceeds to the next step. For example, the processor 81 calculates the angle of the ring direction with respect to the yaw direction indicated by the ring direction data Dj based on the attitude in the yaw direction obtained in step S193, and updates the ring direction data Dj in accordance with the calculated angle with respect to the yaw direction.

Next, the processor 81 calculates the average acceleration of the right controller 4 obtained for an immediately preceding first data obtaining period (e.g., 30 frames) (step S195), and proceeds to the next step. For example, with reference to the acceleration data Dc, the processor 81 calculates the average value of the acceleration of the right controller 4 during an immediately preceding first data obtaining period.

Next, the processor 81 calculates the angle of the ring direction in the pitch direction based on the average acceleration calculated in step S195 (step S196), and proceeds to the next step. For example, assuming that the average acceleration is the gravity acceleration, the processor 81 calculates the angle of the ring direction in the pitch direction with reference to the assumed gravity acceleration.

Next, the processor 81 calculates the amount of change of angle in the pitch direction based on the angular velocity of the right controller 4 about the y axis (the angular velocity about the horizontal direction) obtained for an immediately preceding second data obtaining period (<first data obtaining period; 15 frames, for example) (step S197), and proceeds to the next step. For example, with reference to the angular velocity data Db, the processor 81 calculates the amount of change of angle in the pitch direction by using the angular velocity of the right controller 4 about the y axis (the angular velocity about the horizontal direction) during an immediately preceding second data obtaining period.

Next, the processor 81 newly calculates the angle of the ring direction in the pitch direction by adding the amount of change of angle in the pitch direction calculated in step S197 to the angle of the ring direction in the pitch direction calculated in step S196 (step S198), and exits the process of the sub-routine. For example, the processor 81 updates the ring direction data Dj in accordance with the angle of the ring direction in the pitch direction to which the amount of change of angle is added.

Referring back to FIG. 18, after the ring direction calculation process of step S112, the processor 81 performs an object action control process (step S113), and proceeds to the next step. For example, the processor 81 causes the virtual object PO to act and/or move in the virtual game space with the action in accordance with the state indicated by the state data Dk. The processor 81 causes the virtual object PO to act so that the legs of the virtual object PO move up and down while setting the moving speed of the virtual object PO in accordance with the thigh-raised time indicated by the thigh-raised time data Df, the thigh-lowered time indicated by the thigh-lowered time data Dg and the state indicated by the state data Dk. The processor 81 sets the direction of the ring object R that is held by both hands of the virtual object PO in the virtual game space in accordance with the ring direction indicated by the ring direction data Dj, and changes the attitude of the virtual object PO and the ring object R so that the ring axis of the ring object R is directed toward the set direction. Then, based on the strain value representing the deformation of the ring-shaped portion 201 of the ring-shaped extension apparatus 5, when it is detected that a predetermined attack operation (e.g., an operation of deforming the ring-shaped portion 201 so that the grip covers 203 and 204 of the ring-shaped extension apparatus 5 move closer to each other with the deformation from the normal state being greater than or equal to a threshold) has been performed by the user using the ring-shaped extension apparatus 5, the processor 81 produces special effects showing the ring object R attacking in the ring direction in response to the attack operation. When the attack from the ring object R gives an effect on another object (e.g., the object T (see FIG. 13)), the processor 81 changes the state of the other object (e.g., makes it disappear) in accordance with the effect. Then, the processor 81 updates the virtual object data Dm of each object in accordance with the action, position, attitude, state, etc., of the object.

Next, the processor 81 performs an image generation/display control process (step S114), and proceeds to the next step. For example, the processor 81 generates the virtual game space by arranging a plurality of objects in the virtual game space based on the action, position, attitude, state, etc., indicated by the virtual object data Dm. The processor 81 arranges a virtual camera in the virtual space (e.g., arranges a virtual camera at a position behind the virtual object PO so as to include the field of view of the virtual object PO), and generates the image of the virtual game space as seen from the virtual camera to output the image of the virtual game space to the non-portable monitor 9.

Next, the processor 81 determines whether or not to end the process (step S115). Examples of the condition for ending the process in step S115 include the satisfaction of a process-ending condition and the user performing a process-ending operation. When the process is not to be ended, the processor 81 returns to step S102 and repeats the process. When the process is to be ended, the processor 81 ends the process of the flow chart. Thereafter, the series of processes of steps S102 to step S115 is repeatedly executed until it is determined to end the process in step S115.

Thus, in the present embodiment, in order for the user to maintain the walking state, the jogging state or the running state without the step-in-place operation by the user being determined to be in the stationary state, it is necessary to continuously move both the left controller 3 (the belt-shaped extension apparatus 6) and the right controller 4 (the ring-shaped extension apparatus 5), and the predetermined action of the virtual object PO is continued by satisfying the continuation condition both on the upper body side where the movement is detected by the left controller 3 and on the lower body side where the movement is detected by the right controller 4, thus promoting operations using the whole body of the user. Since the action of the virtual object PO can be controlled by using a combination of both of the operation data output from the left controller 3 and the right controller 4, it is possible to increase the variety of actions that can be performed by the virtual object PO.

Note that while the embodiment described above is directed to an embodiment where the belt-shaped extension apparatus 6 to which the left controller 3 is attached is fastened to a leg of the user, the left controller 3 may be attached to the user in any other manner. As a first example, the belt-shaped extension apparatus 6 to which the left controller 3 is attached may be fastened to other leg portions (e.g., the right thigh, the left ankle, the right ankle, etc.) of the user or to other lower body portions such as a waist portion. Also in the first example, the movement of the lower body of the user can be calculated by the output from the sensor detecting the movement of the left controller 3, and it is possible to realize a process similar to that of the embodiment described above. As a second example, as opposed to being attached to the belt-shaped extension apparatus 6, the left controller 3 may be accommodated or secured in a garment worn by the user (e.g., inside a pocket, inside a sock, under a belt or a waist rubber, etc.). Also in the second example, the movement of the lower body of the user can be calculated by the output from the sensor detecting the movement of the left controller 3, and it is possible to realize a process similar to that of the embodiment described above.

While operation data of the left controller 3 and the right controller 4 are transmitted to the main body apparatus 2 with the main body apparatus 2 and the left controller 3 and the right controller 4 having wireless communication capability in the embodiment described above, the operation data may be transmitted to the main body apparatus 2 in any other manner. For example, operation data of one of the left controller 3 and the right controller 4 may be transmitted to the other controller, from which operation data of both controllers (or processed operation data) are transmitted together to the main body apparatus 2.

The method for detecting the attitude and the movement of the left controller 3 and the right controller 4 (the attitude and the movement of the belt-shaped extension apparatus 6 and the ring-shaped extension apparatus 5) of the embodiment described above is merely illustrative, and the attitude and the movement may be detected by using any other method or any other data. The acceleration sensor and/or the angular velocity sensor described above are examples of sensors that output data used for calculating the attitude and the movement of the left controller 3 and/or the right controller 4. For example, in other embodiments, the left controller 3 and/or the right controller 4 may include a magnetic sensor instead of, or in addition to, the acceleration sensor and/or the angular velocity sensor, and the attitude and the movement of the left controller 3 and/or the right controller 4 may be calculated by using the magnetism detected by the magnetic sensor. There is no limitation on the method for calculating the attitude and the movement of the left controller 3 and/or the right controller 4. For example, in other embodiments, the main body apparatus 2 may capture the image of the left controller 3 and/or the right controller 4 (the belt-shaped extension apparatus 6 and/or the ring-shaped extension apparatus 5) using an image-capturing device to calculate the attitude of the left controller 3 and/or the right controller 4 (the belt-shaped extension apparatus 6 and/or the ring-shaped extension apparatus 5) by using the captured image.

The game system 1 may be any type of a system, e.g., a portable game apparatus or any portable electronic device (a PDA (Personal Digital Assistant), mobile phone, a personal computer, a camera, a tablet, etc.). In such a case, the input device for performing an operation of moving the object does not need to be the left controller 3 or the right controller 4, but may be another controller, a mouse, a touchpad, a touch panel, a trackball, a keyboard, a cross key, a slide pad, etc.

Although the information processes are performed on the game system 1 in the description above, at least some of the processes of the process steps described above may be performed by another apparatus. For example, when the game system 1 is capable of communicating with another apparatus (e.g., another server, another image display apparatus, another game apparatus, or another portable terminal), the process steps described above may be executed in cooperation with the other apparatus. Thus, it is possible to preform processes similar to those described above by performing at least some of processes using another apparatus. The information process described above may be executed by one processor or a plurality of processors cooperating together included in an information processing system including at least one information processing apparatus. Although the processor 81 of the game system 1 may execute a predetermined program for performing the information processes in the embodiment described above, some or all of the processes described above may be performed by a dedicated circuit included in the game system 1.

According to the variation described above, the present embodiment can be implemented in a so-called "cloud computing" system or a distributed wide area network or local network system. For example, in a distributed local network system, the processes described above can be executed in cooperation between a home-console information processing apparatus (a home-console game apparatus) and a portable information processing apparatus (a portable game apparatus). Note that in these systems, it is understood that there is no particular limitation on the apparatus or apparatuses to be used for the processes described above, and that the present embodiment can be implemented no matter how the processes are distributed.

It is understood that the order of processes, setting values, determination conditions, etc., used in the information processes described above are merely illustrative, and the present embodiment can be realized even with other orders, other setting values and other determination conditions.

The program may be loaded onto the game system 1 via an external storage medium such as an external memory, or may be loaded onto the game system 1 via a wired or wireless communication network. The program may be pre-recorded on a non-volatile storage device inside the game system 1. Note that the information storage medium for storing the program described above may be a CD-ROM, a DVD or other similar media, such as an optical disc storage medium, a flexible disc, a hard disk, a magneto-optical disc and a magnet tape, as well as a non-volatile memory. The information storage medium for storing the program described above may also be a volatile memory capable of storing the program. Any of such storage media can be said to be a recording medium that can be read by a computer, or the like. For example, the program on such a recording medium may be loaded onto a computer, or the like, to be executed thereon, thereby realizing the various functions described above.

While some example systems, methods, devices and units have been described above in detail, they are merely illustrative and are not intended to limit the scope of the present disclosure. It is understood that various improvements and modifications can be made without departing from the spirit and scope of the appended claims, and that the scope of the present disclosure should be construed based only on the scope of the appended claims. It is understood that from the description of the specific embodiments, those skilled in the art can determine the range of equivalence based on the description of the present embodiment and the technical knowledge. It should be understood that for any element written in a singular form preceded by a word such as "a" or "an", as used herein, a plurality is not excluded for that element. It should also be understood that any term used herein is used in a sense in which the term is normally used in the pertinent field of art, unless otherwise noted. Therefore, unless defined otherwise, any technical term used herein means as it is commonly understood by those skilled in the art to which the present embodiment pertains. In case of any contradiction, the present specification (including the definitions therein) precedes.

As described above, the present embodiment can be used as an information processing system, an information processing program, an information processing apparatus and an information processing method, etc., with which it is possible to encourage the user of apparatuses to perform whole body exercises.

What is claimed is:

1. An information processing system comprising a first apparatus, a second apparatus and an information processing apparatus, wherein:
   the first apparatus is attachable to a first body part of a user and includes:
      a first sensor configured to detect movement of the first apparatus; and
      a first transmitter configured to transmit output of the first sensor;
   the second apparatus is manipulable by a second body part of the user and includes:
      a second sensor configured to detect movement of the second apparatus;
      a second transmitter configured to transmit output of the second sensor, wherein:
   the information processing apparatus includes a computer configured to perform operations comprising:
      receiving the outputs transmitted from the first sensor and the second sensor; and
      causing a virtual object to perform a first action in a virtual space while the received outputs from the first sensor and the second sensor both satisfy a condition; and when the virtual object is performing the first action, the virtual object is caused to perform a second action while the performance of the first action is further based on the output from the second sensor.

2. The information processing system according to claim 1, wherein the second apparatus is handheld.

3. The information processing system according to claim 1, wherein the second apparatus is attachable to the second body part.

4. The information processing system according to claim 1, wherein the first apparatus is attachable to the user at or below the belt, and the second apparatus is not.

5. The information processing system according to claim 1, wherein the first action includes movement of the virtual object in the virtual space.

6. The information processing system according to claim 1, wherein a determination that the virtual object is to take the first action in the virtual space in dependence on the received output from the first sensor is made in response to the received outputs from the first and second sensors indicating that the first and second apparatuses are both moving.

7. The information processing system according to claim 6, wherein the first action is a movement action and the second action is a non-movement action.

8. An information processing method for use with an information processing system comprising a first apparatus attachable to a first body part of a user and including a first sensor configured to detect movement of the first apparatus and a first transmitter configured to transmit output of the first sensor, and a second apparatus manipulable by a second body part of the user and including a second sensor configured to detect movement of the second apparatus and a second transmitter configured to transmit output of the second sensor, the method comprising:

receiving outputs transmitted from the first sensor and the second sensor; and causing a virtual object to perform a first action in a virtual space while the received outputs from the first sensor and the second sensor both satisfy a condition, via a computer included in the information processing system;

wherein when the virtual object is performing the first action, the virtual object is caused to perform a second action via the computer while the performance of the first action is further based on the output from the second sensor.

9. The information processing method according to claim 8, wherein the second apparatus is handheld.

10. The information processing method according to claim 8, wherein the second apparatus is attachable to the second body part.

11. The information processing method according to claim 8, wherein the first apparatus is attachable to the user at or below the belt, and the second apparatus is not.

12. The information processing method according to claim 8, wherein the first action includes movement of the virtual object in the virtual space.

13. The information processing method according to claim 8, wherein a determination that the virtual object is to take the first action in the virtual space in dependence on the received output from the first sensor is made in response to the received outputs from the first and second sensors indicating that the first and second apparatuses are both moving.

14. The information processing method according to claim 13, wherein the first action is a movement action and the second action is a non-movement action.

15. A non-transitory computer readable storage medium storing instructions executable by a computer of an information processing system comprising a first apparatus attachable to a first body part of a user and including a first sensor configured to detect movement of the first apparatus and a first transmitter configured to transmit output of the first sensor, and a second apparatus manipulable by a second body part of the user and including a second sensor configured to detect movement of the second apparatus and a second transmitter configured to transmit output of the second sensor, the instructions, when executed, cause the computer to perform operations comprising:

receiving outputs transmitted from the first sensor and the second sensor; and causing a virtual object to perform a first action in a virtual space while the received outputs from the first sensor and the second sensor both satisfy a condition, via a computer included in the information processing system;

wherein when the virtual object is performing the first action, the virtual object is caused to perform a second action via the computer while the performance of the first action is further based on the output from the second sensor.

16. The non-transitory computer readable storage medium according to claim 15, wherein the second apparatus is handheld.

17. The non-transitory computer readable storage medium according to claim 15, wherein the second apparatus is attachable to the second body part.

18. The non-transitory computer readable storage medium according to claim 15, wherein the first apparatus is attachable to the user at or below the belt, and the second apparatus is not.

19. The non-transitory computer readable storage medium according to claim 15, wherein the first action includes movement of the virtual object in the virtual space.

20. The non-transitory computer readable storage medium according to claim 15, wherein a determination that the virtual object is to take the first action in the virtual space in dependence on the received output from the first sensor is made in response to the received outputs from the first and second sensors indicating that the first and second apparatuses are both moving.

21. The non-transitory computer readable storage medium according to claim 20, wherein the first action is a movement action and the second action is a non-movement action.

* * * * *